(12) United States Patent
Mitarai

(10) Patent No.: US 11,544,628 B2
(45) Date of Patent: Jan. 3, 2023

(54) INFORMATION PROCESSING APPARATUS AND INFORMATION PROCESSING METHOD FOR GENERATING CLASSIFIER USING TARGET TASK LEARNING DATA AND SOURCE TASK LEARNING DATA, AND STORAGE MEDIUM

(71) Applicant: CANON KABUSHIKI KAISHA, Tokyo (JP)

(72) Inventor: Yusuke Mitarai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1338 days.

(21) Appl. No.: 15/618,677

(22) Filed: Jun. 9, 2017

(65) Prior Publication Data
US 2017/0364826 A1    Dec. 21, 2017

(30) Foreign Application Priority Data
Jun. 15, 2016   (JP) .............................. JP2016-119128

(51) Int. Cl.
    *G06N 20/10*    (2019.01)
    *G06N 20/00*    (2019.01)
    *G06F 16/903*   (2019.01)

(52) U.S. Cl.
    CPC ....... *G06N 20/10* (2019.01); *G06F 16/90335* (2019.01); *G06N 20/00* (2019.01)

(58) Field of Classification Search
    None
    See application file for complete search history.

(56) References Cited

U.S. PATENT DOCUMENTS 9,147,130 B2    9/2015 Saruta et al.
9,245,199 B2    1/2016 Saruta et al.
(Continued)

FOREIGN PATENT DOCUMENTS

CN    102262645 A    11/2011
CN    102542287 A    7/2012
(Continued)

OTHER PUBLICATIONS

Miao, Y.-Q. et al., "Cross-domain facial expression recognition using supervised kernel mean matching," 2012 11th Intl Conf. on Machine Learning and Applications (2012) pp. 326-332. (Year: 2012).*

(Continued)

*Primary Examiner* — Brian M Smith
(74) *Attorney, Agent, or Firm* — Carter, DeLuca & Farrell LLP

(57) ABSTRACT

On the basis of a difference between first distribution regarding target task learning data as a plurality of learning data which belongs to a first category of a first task as a target task and second distribution regarding a plurality of learning data which belongs to the first category of source task learning data as learning data which belongs to the first category of a second task different from the first task, a transformation parameter for transforming the source task learning data is adjusted, the source task learning data is transformed based on the adjusted transformation parameter, and a classifier regarding the first task is generated based on the transformed source task learning data and the target task learning data.

17 Claims, 12 Drawing Sheets

(56) References Cited

U.S. PATENT DOCUMENTS

| | | | |
|---|---|---|---|
| 9,697,441 | B2 | 7/2017 | Mitarai et al. |
| 2011/0295783 | A1* | 12/2011 | Zhao .................. G06F 16/337 706/12 |
| 2014/0343923 | A1* | 11/2014 | Heilman ................ G06F 40/30 704/9 |
| 2016/0070986 | A1 | 3/2016 | Chidlovskii et al. |
| 2017/0220951 | A1* | 8/2017 | Chidlovskii ............ G06F 16/35 |
| 2017/0286782 | A1* | 10/2017 | Pillai .................... B60W 50/14 |

FOREIGN PATENT DOCUMENTS

| | | |
|---|---|---|
| JP | 3003353 B2 | 1/2000 |
| JP | 2006-079272 A | 3/2006 |
| JP | 5414416 B2 | 2/2014 |

OTHER PUBLICATIONS

Gretton, A. et al., "Covariate shift by kernel mean matching," book chapter verified online at <www.cs.cmu.edu/~arthurg/talks.html> before at least May 3, 2015 via web.archive.org, 38 pp. (Year: 2009).*

Zhong, E. et al., "Cross validation framework to choose amongst models and datasets for transfer learning," Joint European Conf. on Machine Learning and Knowledge Discovery in Databases (2010) pp. 547-562. (Year: 2010).*

Ri-Xian, L. et al., "Defects detection based on deep learning and transfer learning," Metallurgical and Mining Industry, No. 7 (2015) pp. 312-321. (Year: 2015).*

Lu, C. et al., "Surpassing human-level face verification performance on LFW with GaussianFace," downloaded from <https://arxiv.org/abs/1404.3840> (Dec. 20, 2014) 13 pp. (Year: 2014).*

Cui, X. et al., "Maximum likelihood nonlinear transformations based on deep neural networks," IEEE/ACM Trans. on Audio, Speech, and Language Processing vol. 24 No. 11 (Nov. 2016) pp. 2023-2031. (Year: 2016).*

Hoffman, J. et al., "Assymetric and category invariant feature transformations for domain adaptation," Int. J. Comput. Vis. vol. 109 (2014) pp. 28-41. (Year: 2014).*

Lim, J., "Transfer learning by borrowing examples for multiclass object detection," MIT Thesis (Sep. 2012) 33 pp. (Year: 2012).*

Brian Kulis et al, "What You Saw is Not What You Get: Domain Adaptation Using Asymmetric Kernel Transforms", IEEE Conference on Computer Vision and Pattern Recognition, pp. 1785-1792, 2011.

Dalal, N. et al., "Human Detection using Oriented Histograms of Flow and Appearance", IEEE European Conference on Computer Vision, vol. 2, pp. 428-441, 2006.

Sugiyama, M. et al., "Density-Difference Estimation", Neural Computation, vol. 25, No. 10, pp. 2734-2775, 2013.

Yamada, M. T., et al., "Relative Density-Ratio Estimation for Robust Distribution Comparison", Advances in Neural Information Processing Systems 24, pp. 594-602, 2011.

Saenko et al. "Adapting Visual Category Models to New Domains," Computer Vision—ECCV 2010, Sep. 5, 2010, pp. 213-226.

Extended European Search Report dated Oct. 18, 2017 in corresponding European Patent Application No. 17000986.4, 9 pages.

EP Office Action for application No. 17 000 986.4 dated Dec. 14, 2018 (8 pages).

European Office Action for application No. 17 000 986.4 dated Dec. 12, 2019.

Sinno Jialin Pan et al. Transfer Learning via Dimensionality Reduction, Proceedings of the Twenty-Third AAAI Conference on Artificial Intelligence, Jan. 1, 2008 (Jan. 1, 2008), pp. 677-682.

Sinno Jialin Pan et al. Domain Adaptation via Transfer Component Analysis, IEEE Transactions on Neural Networks, vol. 22, No. 2, Feb. 1, 2011 (Feb. 1, 2022), pp. 199-210.

Saenko et al., Adapting Visual Category Models to New Domains, Daniilidis, P. Maragos, N. Paragios (Eds.): ECCV 2010, Part IV, LNCS 6314, pp. 213-226, 2010.

Japanese Office Action for Application No. 2016119128 dated Jul. 14, 2020 with English translation.

Japanese Office Action for Application No. 2016-119128 dated Dec. 8, 2020 with English translation.

Communication issued by the European Patent Office dated Nov. 12, 2020 in corresponding EP Patent Application No. 17000986.4.

Notice on the First Office Action issued by the National Intellectual Property Administration of the People's Republic of China dated Apr. 6, 2021 in corresponding CN Patent Application No. 201710451308.1, with English translation.

Sugiyama, M., "Distance Approximation between Probability Distributions: Recent Advances in Machine Learning" Transactions of The Japan Society for Industrial and Applied Mathematics (Sep. 25, 2013) vol. 23, No. 3, pp. 439-452, published by The Japan Society for Industrial and Applied Mathematics, Tokyo, Japan, with English Abstract.

* cited by examiner

INFORMATION PROCESSING APPARATUS AND INFORMATION PROCESSING METHOD FOR GENERATING CLASSIFIER USING TARGET TASK LEARNING DATA AND SOURCE TASK LEARNING DATA, AND STORAGE MEDIUM

BACKGROUND OF THE INVENTION

Field of the Invention

The present invention relates to an information processing apparatus, an information processing method, and a storage medium.

Description of the Related Art

As a method of classifying whether or not an input pattern is a pattern of a specific category, various kinds of methods have been proposed. For example, such methods can be used in such an application that, from a number of data, a pattern as a specific category (specific category pattern) is detected or a pattern different from the specific category (non-specific category pattern) is detected.

As a method of classifying whether or not the input pattern is the pattern of the specific category, there is a method whereby a 2-class classifier such as Support Vector Machine (SVM) or the like is used. It is a method whereby a classifier for separating the specific category pattern and the non-specific category pattern is generated by using a number of the specific category patterns and a number of the non-specific category patterns, and the pattern is classified by using the generated classifier.

However, there is a case where either a data amount of the specific category patterns or a data amount of the non-specific category patterns is insufficient. For example, there is a case where the classifier is generated in such a manner that if the data amount of the non-specific category patterns which are used for the generation of the classifier is insufficient, it is liable to erroneously determine that a category of the non-specific category patterns not used for the generation of the classifier is a specific category. Therefore, there is such a technique called a transposition learning that in the generation of the classifier, in the case where it is difficult to assure learning data with respect to a task as a target by an amount which is proper for learning or the like, learning data with respect to another task is used.

As shown in the method disclosed in Japanese Patent No. 3003353, a method whereby learning data of a task A in which a sufficient amount of learning data exists is transformed and is added to learning data in a task B which wants to learn a pattern in a situation where the learning data is insufficient has been proposed. By adding data from another task and performing the learning, the learning can be performed even in a situation where the learning data is insufficient. This method is an example of the method of the transposition learning. A transformation rule for transforming from the task A to the task B is obtained by using the learning data of the task A corresponding to each learning data of the task B, and the other learning data of the task A is transformed by such a transformation rule and is added, that is, transposed to the learning data of the task B. Thus, even in the learning of the pattern using the learning data of the task B in which an amount is insufficient, an amount of data is falsely increased and the learning can be performed.

In Brain Kulis, Kate Saenko, and Trevor Darrell, "What You Saw is Not What You Get: Domain Adaptation Using Asymmetric Kernel Transforms", IEEE Conference on Computer Vision and Pattern Recognition, pp. 1785-1792, 2011, such a mutual transformation rule that learning data which belongs to the same category between different tasks is mapped nearer and learning data which belongs to different categories is mapped in the longer distance is obtained. A method whereby learning data of another task is transformed by its transformation rule and transposed to learning data of a target task and the learning is performed has also been proposed. According to such methods, in a manner similar to the method disclosed in Japanese Patent No. 3003353, in the learning using data of a target task, even when an amount of data of such a task is small, by transforming a pattern from another task and adding, the learning in a state where an amount of data is falsely increased can be performed.

As just described, in a generating method of a classifier having an object to classify whether or not an input pattern is a pattern of a specific category, the following processes can be executed. That is, even when an amount of learning data which can be used for the learning is insufficient, by using the learning data of another task, the processes can be executed by falsely using a large amount of learning data.

According to the related arts such as the technique disclosed in Japanese Patent No. 3003353, and the technique of Kulis, et al., on the basis of certain specific data contained in each learning data which corresponds between the different tasks, the transformation rule of the learning data between the tasks is obtained. Therefore, the obtained transformation rule becomes a transformation rule which depends on the used specific data. Consequently, the transformation rule is insufficient in dependence on the used data and there is a possibility that the proper learning data is not obtained.

SUMMARY OF THE INVENTION

According to an aspect of the present invention, there is provided an information processing apparatus comprising: a first obtaining unit configured to obtain, in a first task as a target task, a plurality of learning data, as target task learning data, which belongs to a first category; a second obtaining unit configured to obtain, in a second task different from the first task, a plurality of learning data, as source task learning data, including the learning data which belongs to the first category and learning data which belongs to a second category different from the first category; an adjusting unit configured to adjust a transformation parameter for transforming the source task learning data on the basis of a difference between first distribution regarding the plurality of learning data which belongs to the first category of the target task learning data and second distribution regarding the plurality of learning data which belongs to the first category of the source task learning data; a transforming unit configured to transform the source task learning data on the basis of the transformation parameter adjusted by the adjusting unit; and a generating unit configured to generate a classifier regarding the first task on the basis of the source task learning data transformed by the transforming unit and the target task learning data.

According to the aspect of the present invention, the classifier which can classify at a higher precision by using a transposition learning can be generated.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

In embodiment 1, a method whereby an information processing apparatus 10 generates a classifier for detecting an abnormality in an area serving as a monitoring (surveillance) target of a camera 16 on the basis of an image photographed by the camera 16 will be described. Hereinbelow, it is assumed that a category showing a situation where no abnormality occurs, that is, a normal situation is a specific category (first category) and a category showing a situation where some abnormality has occurred is a non-specific category (second category). Hereinbelow, it is assumed that data of the specific category, that is, an image photographed by a monitoring camera in the normal situation is normal data and data of the non-specific category, that is, an image photographed by the monitoring camera in a situation where some abnormality has occurred is abnormal data.

Figure 1:
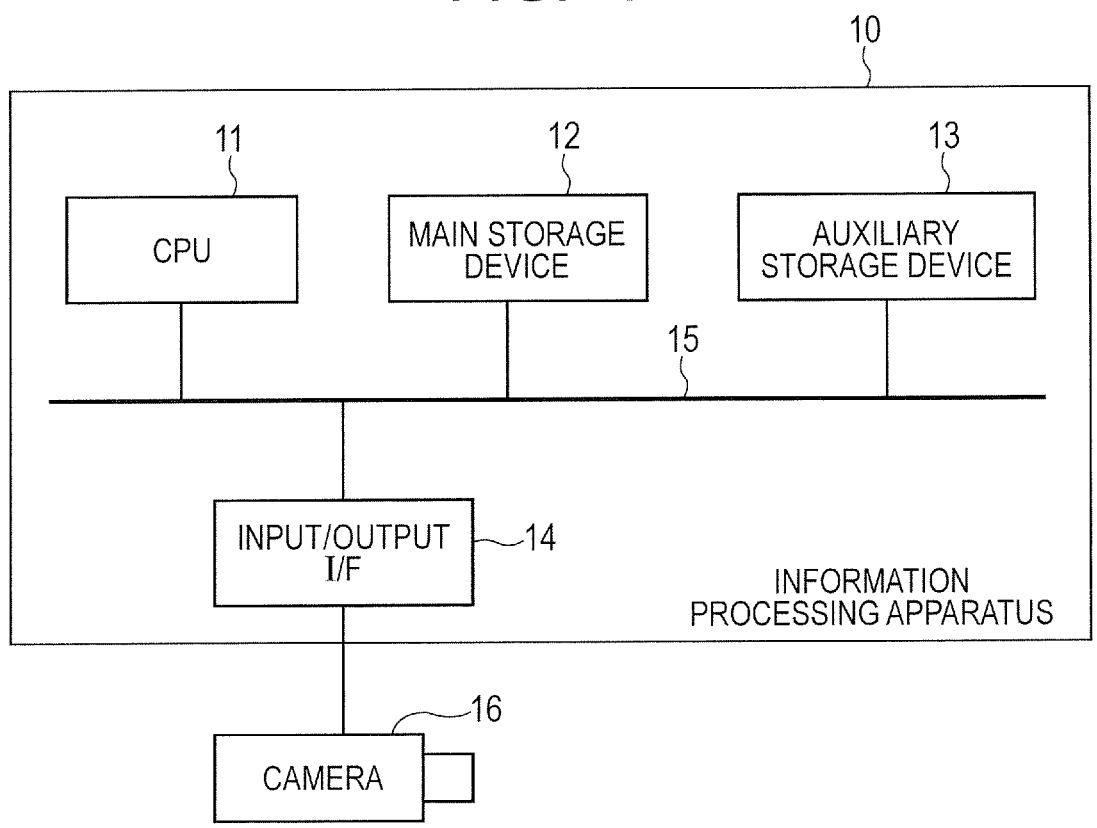
FIG. 1 is a diagram illustrating an example of a hardware construction and the like of an information processing apparatus.

First, an outline of processes in the embodiment will be described. As illustrated in FIG. 1, the information processing apparatus 10 has preliminarily obtained learning data in a target task (target task learning data) as data of the photographed image of a monitoring area from the camera 16. The learning data is data which is used for generation of a classifier and, in the case of the embodiment, it is data of the photographed image of the monitoring area, data of a feature amount extracted from the data of the photographed image, or the like. It is also assumed that the information processing apparatus 10 has obtained at least one learning data in a source task (source task learning data) as data of the photographed images of the monitoring area and another similar area from the camera 16 or another monitoring camera. In the present embodiment, the target task is a task for detecting an abnormal situation of the monitoring area and the source task is a task for detecting an abnormal situation of the area similar to the monitoring area. The target task is an example of the first task. The source task is an example of the second task. The process in the embodiment is such a process that the information processing apparatus 10 generates a classifier for discriminating whether or not the input data is normal by using the target task learning data and the source task learning data. An amount of normal data contained in the target task learning data is an amount which is sufficient for the learning. However, an amount of abnormal data contained in the target task learning data is very smaller than the amount of normal data contained in the target task learning data or is equal to 0.

If an amount of learning data of the non-specific category which is used for the generation of the classifier is smaller than a proper amount, there is a case where such a classifier that it is liable to erroneously determine that a pattern of the non-specific category which is not used for generation of the classifier is a specific category is generated. For example, in such an application that an abnormal situation is detected based on an image photographed by the monitoring camera, the smaller the number of learning data which is used for generation of a classifier and shows the abnormal situation is, the higher a possibility of occurrence of such a situation is. That is, there is a case where such a classifier that an abnormal situation other than a situation corresponding to the learning data used for the learning is determined as a normal situation is generated. In order to suppress the occurrence of such a situation, it is sufficient to prepare a proper amount of patterns showing the abnormal situation are prepared and generate the classifier. However, since a frequency of occurrence of the abnormal situation is very smaller than that of the normal situation, there is such a problem that it is difficult to prepare a proper amount of such patterns.

On the other hand, it is assumed that an amount of normal data contained in the source task learning data is an amount sufficient for the learning in a manner similar to the target task learning data and an amount of abnormal data contained in the source task learning data is larger than that of the target task learning data. For example, if the target task learning data is data obtained by photographing a monitoring area in certain station precincts, the area similar to the monitoring area is an area in which a situation is similar like a monitoring area in another station precincts or the like. The data obtained by photographing in such an area is used as source task learning data. As described above, in the present embodiment, an example in which the classifier is generated by using two kinds of learning data such as target task learning data and source task learning data will be described. However, a sufficient amount of normal data exists even in any one of those learning data. The information processing apparatus 10 obtains a transformation rule of the data on the basis of a difference of the distribution of the learning data of the specific category. The information processing apparatus 10 transforms the learning data which belongs to the non-specific category of the source task learning data on the basis of the obtained transformation rule and uses as learning data which belongs to the non-specific category of the target task. The distribution of the learning data which belongs to the specific category of the target task is an example of the first distribution. The distribution of the learning data which belongs to the specific category of the source task is an example of the second distribution. By transforming the learning data by the transformation rule which does not depend on the specific data, the information processing apparatus 10 can reduce a possibility that the learning data after the transformation becomes improper.

In the present embodiment, the information processing apparatus 10 transforms the abnormal data of the learning data of the source task and adds to the learning data of the target task. Thus, the information processing apparatus 10 can falsely add, as learning data of the target task, the abnormal data of such a type that although it does not exist in the learning data of the target task, it exists in the learning data of the source task. Therefore, the information processing apparatus 10 can raise a possibility that even to the abnormal data of such a type that it does not exist in the learning data of the target task, a classifier which can correctly determine that it is abnormal can be generated.

FIG. 1 is a block diagram illustrating an example of a hardware construction and the like of the information processing apparatus 10. The information processing apparatus 10 includes a CPU 11, a main storage device 12, an auxiliary storage device 13, and an input/output I/F 14. The CPU 11, main storage device 12, auxiliary storage device 13, and input/output I/F 14 are mutually connected through a system bus 15 and mutually transmit and receive information.

The CPU 11 is a central processing unit for controlling a process of the information processing apparatus 10. The main storage device 12 is a storage device which is used as a work area of the CPU 11 or a temporary storage area of data. The auxiliary storage device 13 is a storage device for storing various kinds of programs, various kinds of setting data, the learning data which is used for the generation of the classifier, or the like. The input/output I/F 14 is an interface which is used for input/output of information to/from an external apparatus such as a camera 16 or the like. The camera 16 of the embodiment is a monitoring camera for photographing a set monitoring area and transmitting data of a photographed image to the information processing apparatus 10.

The CPU 11 executes the process on the basis of the program stored in the auxiliary storage device 13 or the like, so that functions of the information processing apparatus 10, which will be described hereinafter in FIGS. 2, 4, 6A to 6J, 9, and 11, and processes of flowcharts, which will be described hereinafter in FIGS. 3, 5, 7, 10, and 12 are realized.

Figure 2:
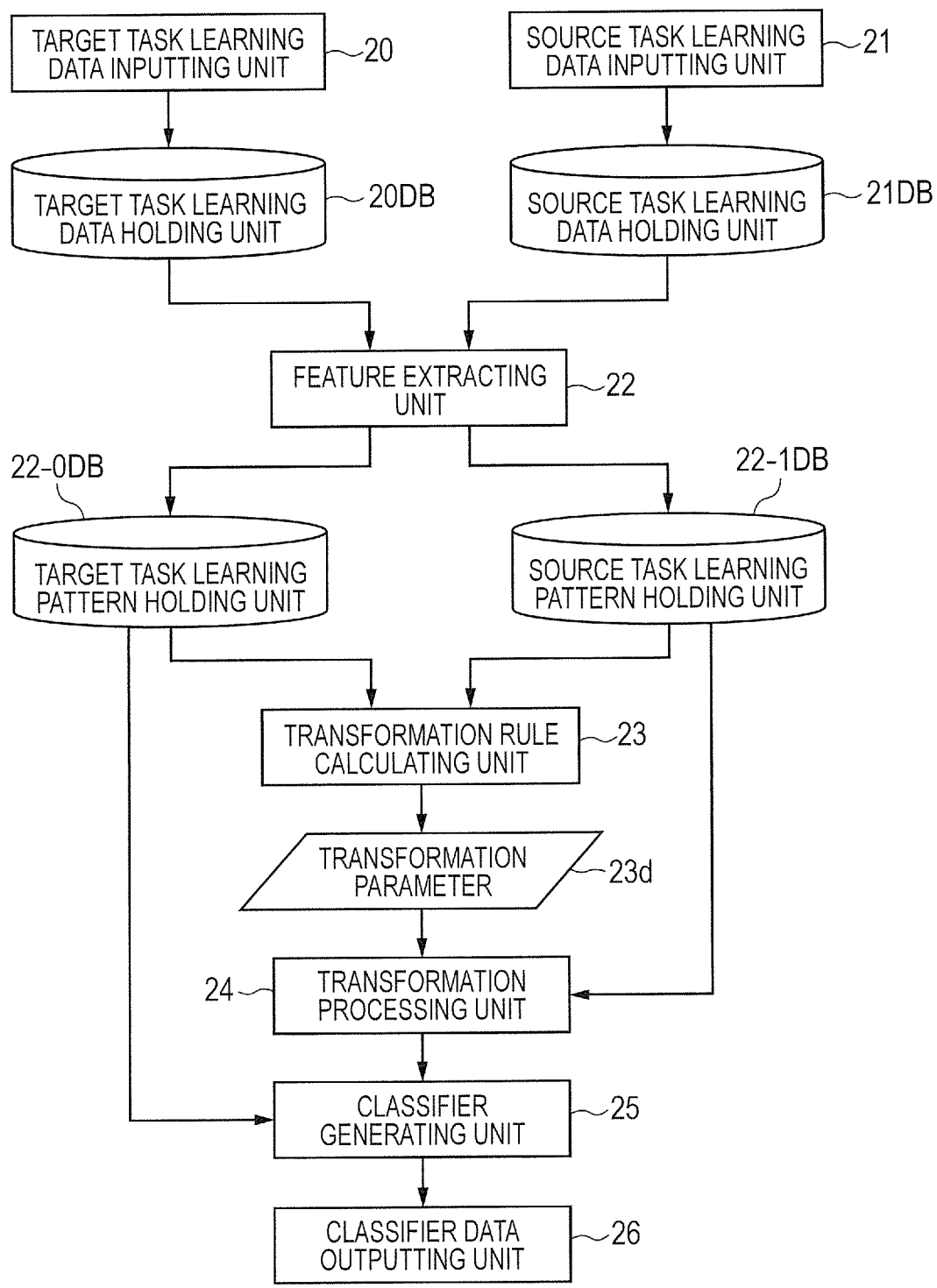
FIG. 2 is a diagram illustrating an example of a function construction and the like of the information processing apparatus.
Figure 3:
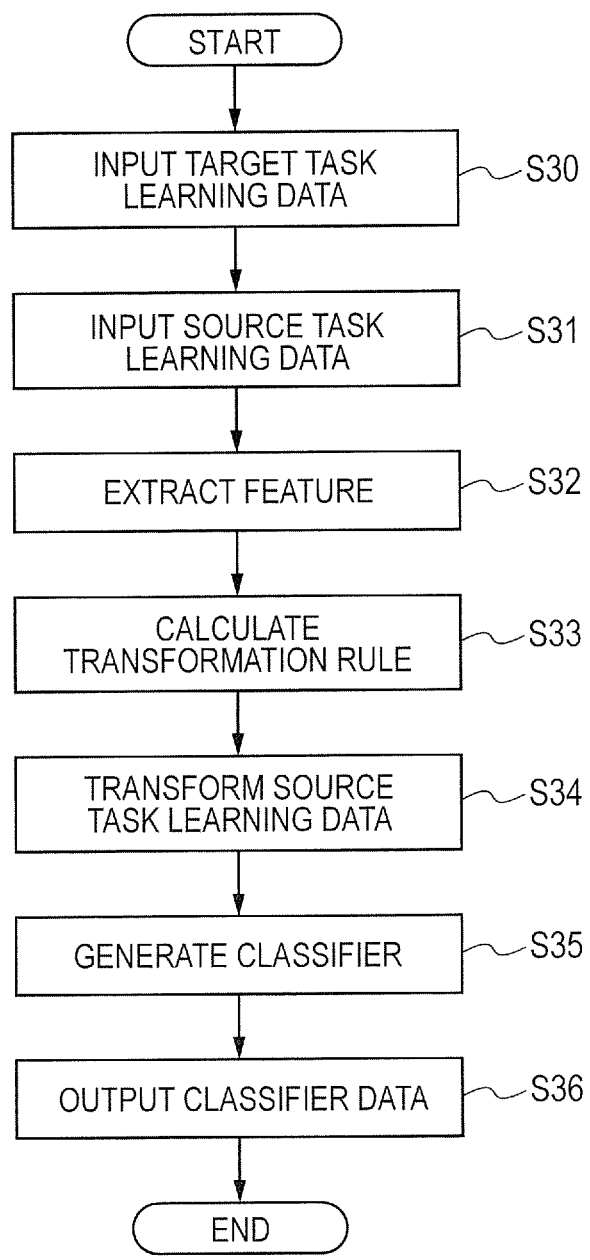
FIG. 3 is a flowchart illustrating an example of a classifier learning process.

FIG. 2 is a block diagram illustrating an example of a function construction and the like to generate a classifier in the information processing apparatus 10 of the embodiment. FIG. 3 is a flowchart illustrating an example of a classifier learning process. A classifier generating method of the embodiment will be described hereinbelow with reference to FIGS. 2 and 3.

The information processing apparatus 10 includes a target task learning data inputting unit 20, a source task learning data inputting unit 21, a target task learning data holding unit 20DB, a source task learning data holding unit 21DB, and a feature extracting unit 22. The information processing apparatus 10 also includes a target task learning pattern holding unit 22-0DB, a source task learning pattern holding unit 22-1DB, a transformation rule calculating unit 23, a transformation processing unit 24, a classifier generating unit 25, and a classifier data outputting unit 26.

The target task learning data inputting unit 20 obtains learning data of a target task from the camera 16, the auxiliary storage device 13, or the like. The source task learning data inputting unit 21 obtains previously-stored learning data of a source task from the auxiliary storage device 13 or the like.

The target task learning data holding unit 20DB is a database for holding the learning data obtained by the target task learning data inputting unit 20 and is installed in the auxiliary storage device 13. The source task learning data holding unit 21DB is a database for holding the learning data obtained by the source task learning data inputting unit 21 and is installed in the auxiliary storage device 13.

The feature extracting unit 22 extracts features from the learning data held in the target task learning data holding unit 20DB and the source task learning data holding unit 21DB. The target task learning pattern holding unit 22-0DB is a database for holding data of a feature vector extracted by the feature extracting unit 22 from the learning data held in the target task learning data holding unit 20DB, and is installed in the auxiliary storage device 13. The source task learning pattern holding unit 22-1DB is a database for holding data of a feature amount extracted by the feature extracting unit 22 from the learning data held in the source task learning data holding unit 21DB, and is installed in the auxiliary storage device 13. The transformation rule calculating unit 23 calculates a transformation rule for transforming a feature amount of the learning data of the source task into a feature amount of the learning data of the target task on the basis of data of feature amounts held in the target task learning pattern holding unit 22-0DB and the source task learning pattern holding unit 22-1DB.

The transformation processing unit 24 transforms the data of the feature amount held in the source task learning pattern holding unit 22-1DB into the feature amount of the learning data of the target task on the basis of the transformation rule calculated by the transformation rule calculating unit 23.

The classifier generating unit 25 generates a classifier on the basis of data of the feature amount held in the target task learning pattern holding unit 22-0DB and data of the feature amount transformed by the transformation processing unit 24.

The classifier data outputting unit 26 outputs data of the classifier generated by the classifier generating unit 25. For example, the classifier data outputting unit 26 records the data of the classifier into the auxiliary storage device 13, thereby outputting.

Subsequently, a specific processing procedure for generating the classifier will be described with reference to FIG. 3.

In S30, the target task learning data inputting unit 20 obtains data of the photographed image of the monitoring area from the camera 16, as learning data which is used for the generation of the classifier for detecting an abnormality in the monitoring area. The target task learning data inputting unit 20 may obtain the data of the photographed image of the monitoring area which has previously been stored in the auxiliary storage device 13 from the auxiliary storage device 13. In the present embodiment, the target task learning data inputting unit 20 obtains Nt normal data and Mt abnormal data as learning data. The target task learning data inputting unit 20 records the obtained learning data into the target task learning data holding unit 20DB.

In S31, the source task learning data inputting unit 21 obtains data of the photographed image of an area similar to the monitoring area which has previously been stored in the auxiliary storage device 13 from the auxiliary storage device 13. At this time, the source task learning data inputting unit 21 obtains Ns normal data and Ms abnormal data as learning data of the source task, respectively. The source task learning data inputting unit 21 may obtain the photographed image of the area similar to the monitoring area, as learning data of the source task from the camera 16 or another monitoring camera. The source task learning data inputting unit 21 records the obtained learning data of the source task into the source task learning data holding unit 21DB.

In S32, the feature extracting unit 22 extracts features from the data obtained in S30 and S31, respectively. In the present embodiment, since the data obtained in S30 and S31 is the image, as a feature extraction to the image as a target, the feature extracting unit 22 extracts a Cubic Higher-order Local Auto-Correlation (CHLAC) disclosed in Japanese Patent Application Laid-Open No. 2006-079272. Thus, the feature extracting unit 22 extracts a 251-dimensional feature vector to one data.

The feature extracting unit 22 records the feature vector extracted from the data obtained in S30 into the target task learning pattern holding unit 22-0DB. The feature extracting unit 22 records the feature vector extracted from the data obtained in S31 into the source task learning pattern holding unit 22-1DB. The feature vector which had been extracted from the normal data of the learning data of the target task and was recorded in the target task learning pattern holding unit 22-0DB is assumed to be a target normal pattern hereinbelow. The feature vector which had been extracted from the abnormal data of the learning data of the target task and was recorded in the target task learning pattern holding unit 22-0DB is assumed to be a target abnormal pattern hereinbelow. The feature vector which had been extracted from the normal data of the learning data of the source task and was recorded in the source task learning pattern holding unit 22-1DB is assumed to be a source normal pattern hereinbelow. The feature vector which had been extracted from the abnormal data of the learning data of the source task and was recorded in the source task learning pattern holding unit 22-1DB is assumed to be a source abnormal pattern hereinbelow.

Therefore, in the present embodiment, Nt 251-dimensional vectors are recorded as a target normal pattern and Mt 251-dimensional vectors are recorded as a target abnormal pattern into the target task learning pattern holding unit 22-0DB, respectively. Ns 251-dimensional vectors are recorded as a source normal pattern and Ms 251-dimensional vectors are recorded as a source abnormal pattern into the source task learning pattern holding unit 22-1DB, respectively. Although the feature extracting unit 22 performs in S32 the extraction of the CHLAC as a feature amount in the embodiment, it may extract another feature amount. For example, the feature extracting unit 22 may extract a Motion Boundary Histogram (MBH) feature amount or the like disclosed in Dalal, N., B. Triggs and C. Schmid, "Human Detection using Oriented Histograms of Flow and Appearance", IEEE European Conference on Computer Vision, vol. 2, pp. 428-441, 2006.

In S33, the transformation rule calculating unit 23 executes a process for obtaining a transformation rule for transforming the feature amount of the learning data of the source task into the feature amount of the learning data of the target task on the basis of the feature amount extracted in S32. The transformation rule calculating unit 23 executes the process by using a plurality of target normal patterns recorded in the target task learning pattern holding unit 22-0DB and a plurality of source normal patterns recorded in the source task learning pattern holding unit 22-1DB. In the present embodiment, the transformation rule calculating unit 23 calculates a parameter for transforming the feature amount of the learning data of the source task into the feature amount of the learning data of the target task by using a linear transformation. That is, now assuming that the source normal pattern or the source abnormal pattern is a vector z, the vector z is transformed into a 251-dimensional vector similar to the target normal pattern or the target abnormal pattern. Now assuming that the vector after the transformation is a vector x', the transformation processing unit 24 transforms it into $x' = A^T z + b$ by using a square matrix A of degree 251 as a dimension of the vector x' and a 251-dimensional bias vector b. In this equation, a superscript figure T denotes a transposition of the matrix. In S33, the transformation rule calculating unit 23 obtains a value of each component of the matrix A as a transformation parameter which is used for the transformation and a value of each element of the bias vector b.

In the present embodiment, the transformation rule calculating unit 23 obtains the value of each component of the matrix A and the value of each element of the bias vector b by minimizing a difference between the distribution of the target normal patterns and the distribution of the source normal patterns after they were transformed by the linear transformation. More specifically speaking, the transformation rule calculating unit 23 obtains such a value of each component of the matrix A and such a value of each element of the bias vector b as to minimize an estimation value of an L2 distance between the distribution of the target normal patterns and the distribution of the source normal patterns after they were transformed. That is, a transformation parameter of the linear transformation is obtained so that the difference of density distribution of each data is minimized. In the present embodiment, the transformation rule calculating unit 23 obtains the estimation value of the L2 distance between the distribution of the target normal patterns and the distribution of the source normal patterns after they were transformed by the estimating method disclosed in Masashi Sugiyama, Takafumi Kanamori, Taiji Suzuki, Marthinus Christoffel du Plessis, Song Liu and Ichiro Takeuchi, "Density-Difference Estimation", Neural Computation, Vol., 25, No. 10, pp. 2734-2775, 2013. The transformation rule calculating unit 23 may obtain the value of each component of the matrix A and the value of each element of the bias vector b by such arbitrary values that the estimation value of the L2 distance between the distribution of the target normal patterns and the distribution of the source normal patterns after they were transformed is smaller than a preset threshold value.

Now assuming that the distribution of the target normal patterns is equal to x and the distribution of the source normal patterns by the matrix A and the bias vector b after they were transformed is equal to x', an estimation value $L''(x, x')$ of the L2 distance is obtained by the following equation (1).

$$L''(x, x') = 2h^T \theta - \theta^T H \theta \qquad (1)$$

In the equation (1), each of h and θ denotes a (Nt+Ns)-dimensional vector. Besides, H indicates a square matrix of degree (Nt+Ns). In any case, h, H, and θ are expressed by the following equations (2), (3), and (4), respectively.

$$h = \left( h_k = \frac{1}{Nt} \sum_{i=1}^{Nt} \exp\left( -\frac{|x_i - c_k|^2}{2\sigma^2} \right) - \frac{1}{Ns} \sum_{j=1}^{Ns} \exp\left( -\frac{|x'_j - c_k|^2}{2\sigma^2} \right) \right)_{1 \leq k \leq Nt+Ns} \qquad (2)$$

-continued $$H = \left(H_{u,v} = (\pi\sigma^2)^{d/2}\exp\left(-\frac{|c_u - c_v|^2}{4\sigma^2}\right)\right)_{1 \le u,v \le Nt+Ns} \quad (3)$$

$$\theta = (H + \lambda I)^{-1}h \quad (4)$$

In the above equations, $x_i$ denotes an ith target normal pattern and $x_j'$ indicates a jth source normal pattern. Besides, $c_k$ is a value of $c_k=x_k$ when k≤Nt and is a value of $c_k=x_k-Nt'$ when k>Nt. Besides, σ denotes a parameter of a Gaussian basic function, λ indicates a regularlization parameter, and I denotes a unit matrix of degree (Nt+Ns).

In the present embodiment, the transformation rule calculating unit 23 sets an initial value suitable for each element of the matrix A and each element of the bias vector b (for example, sets a value which is obtained based on pseudo random numbers or the like). The transformation rule calculating unit 23 updates a parameter corresponding to the matrix A or the bias vector b on the basis of an equation obtained by differentiating the equation showing the estimation value of the L2 distance shown in the equation (1) by the parameter corresponding to the matrix A or the bias vector b. That is, the transformation rule calculating unit 23 obtains the matrix A and the bias vector b by a gradation method. An equation obtained by differentiating the estimation value of the L2 distance obtained by the equation (1) by a component a of the matrix A as a transformation parameter is expressed by the following equation (5).

$$\frac{\partial L^H(X,X')}{\partial a} = 2\left(\frac{\partial h}{\partial a}\right)^T \{I + \lambda(H+\lambda I)^{-1}\}(H+\lambda I)^{-1}h + \quad (5)$$
$$h^T(H+\lambda I)^{-1}\{2\lambda(H+\lambda I)^{-1} - I\}\frac{\partial H}{\partial a}(H+\lambda I)^{-1}h$$

By using the equation (5), a value after a component $a_{r,c}$ of r-row and c-column of the matrix A was updated is obtained as shown by the following equation (6).

$$a_{r,c}^{new} = a_{r,c}^{old} - \eta\frac{\partial L^H(X,X')}{\partial a_{r,c}} \quad (6)$$

Similarly, a value after a cth element $b_c$ of the bias vector b was updated is expressed by the following equation (7).

$$b_c^{new} = b_c^{old} - \eta\frac{\partial L^H(X,X')}{\partial b_c} \quad (7)$$

In the above equation, η denotes a learning coefficient. A value of η may be a predetermined value or may be gradually decreased each time the matrix A and the bias vector b are updated. For example, the transformation rule calculating unit 23 may update the value of η to η=0.9×η each time the updating of the matrix A and the bias vector b is executed once.

The transformation rule calculating unit 23 repeatedly executes the updating of the matrix A and the bias vector b until both of a decrease amount of the estimation value of the L2 distance and the learning coefficient η are smaller than the preset threshold value (for example, $10^{-6}$ or the like). Thus, the transformation rule calculating unit 23 adjusts the values of the matrix A and the bias vector b as a transformation parameter for the transformation. It is assumed that the parameter for the transformation (in the embodiment, the matrix A and the bias vector b) obtained by the transformation rule calculating unit 23 is a transformation parameter 23d.

As described above, in the present embodiment, the transformation rule calculating unit 23 obtains a transformation rule on the basis of a difference between the distribution of the specific category of the target task learning data and the distribution of the specific category of the source task learning data after the transformation.

Since the gradation method in S33 is a local minimization of the L2 distance, a final result depends on the initial value of the transformation parameter. Therefore, with respect to a plurality of (for example, 3 or 4) preset initial values of the matrix A and the bias vector b, the transformation rule calculating unit 23 may execute the process of S33 and the following processes every those initial values. That is, the transformation rule calculating unit 23 may use the transformation parameter in the case where the final estimation value of the L2 distance is smallest as a result of the processes executed every those initial values. On the other hand, with respect to the parameter σ of the Gaussian basic function and the regularlization parameter λ, it is sufficient that, by an intersection test, the transformation rule calculating unit sets such parameters that an average value of the estimation values of the L2 distance to the test data becomes smallest. The process of S33 is an example of an adjusting process for adjusting the value of the transformation parameter.

In S34, the transformation processing unit 24 executes a process for transforming the Ms source abnormal patterns extracted in S32 by using the transformation rule obtained in S33. In the present embodiment, the transformation processing unit 24 executes the linear transformation using the matrix A and the bias vector b obtained in S33. The source abnormal patterns transformed in S34 are used for the generating process of the classifier which is executed by the classifier generating unit 25. Although the information processing apparatus 10 transforms only the source abnormal patterns in the embodiment, it may also transform the source normal patterns and use for generation of the classifier.

In S35, the classifier generating unit 25 obtains Nt target normal patterns and Mt target abnormal patterns from the target task pattern holding unit 22-0DB. The classifier generating unit 25 generates the classifier by using the obtained Nt target normal patterns and Mt target abnormal patterns and the Ms source abnormal patterns transformed in S34. In the present embodiment, the classifier generating unit 25 performs the learning of non-linear SVM using a Gaussian kernel as a classifier in S35. That is, the classifier generating unit 25 generates a 2-class classifier in which the target normal patterns are assumed to be positive example patterns and the target abnormal patterns and the transformed source abnormal patterns are assumed to be negative example patterns. In the case where the source normal patterns have also been transformed in S34, it is sufficient that, for the learning, the classifier generating unit 25 uses the transformed source normal patterns as positive example patterns.

Although the classifier generating unit 25 performs the learning of SVM as a classifier in S35 in the embodiment, for example, it may perform a generation of another classifier such as a logistic recursion or the like. For example, in the case of performing a generation of a classifier which can set a weight to each pattern and perform the learning such as AdaBoost, the classifier generating unit 25 may set an initial weight of data like a transformed source abnormal pattern to a value smaller than a weight of the target abnormal pattern and perform the learning. In this case, it is desirable that the classifier generating unit 25 sets in such a manner that the larger the final estimation value of the L2 distance obtained in S33 is, the smaller such a weight is.

In S36, the classifier data outputting unit 26 outputs a result of the learning process in S35 to the outside and finishes the process of FIG. 3. For example, the classifier data outputting unit 26 stores the data of the classifier generated in S35 into the auxiliary storage device 13 or the like, thereby outputting. In the present embodiment, since the learning of SVM is performed as a classifier, the classifier data outputting unit 26 outputs a plurality of support vectors, coefficients corresponding thereto, and information of a threshold value.

As described above, in the present embodiment, first, the information processing apparatus 10 obtains a transformation rule on the basis of a difference between the distribution of the specific category data of the target task and the distribution of the specific category data of the source task after the transformation. More specifically speaking, the information processing apparatus 10 obtains the transformation rule so as to locally minimize the difference of each density distribution. Thus, such a transformation rule as to absorb a difference between the tasks without depending on the specific data can be obtained. By transforming the data of the source task by using such a transformation rule, the information processing apparatus 10 can use the transformed data as data for learning in the target task.

As described above, the transformation rule is such a transformation rule as to absorb the difference between the tasks without depending on the specific data. Therefore, for example, by transforming the abnormal data of the source task by using such a transformation rule, a possibility that the transformed abnormal data can be used as abnormal data of the target task rises. That is, the information processing apparatus 10 can reduce a possibility that the learning data after the transformation becomes improper. Therefore, even if an amount of data which can be used for the learning is small, by transforming the data of another task and using as described above, the information processing apparatus 10 can execute the process by falsely using many data. Consequently, according to the classifier generated by the process in the embodiment, as compared with the case where only a small amount of data is used, a possibility that the abnormal data of such a type that, for example, although it does not exist in the target task learning data, it exists in the source task learning data can be detected rises. In other words, the information processing apparatus 10 can further improve a classifying precision of the classifier.

Although the information processing apparatus 10 uses only one source task learning data in the embodiment, a plurality of source task learning data can be also used. More specifically speaking, the information processing apparatus 10 executes the processes of S31 to S33 with respect to each source task learning data and obtains a transformation rule corresponding thereto. It is sufficient that the information processing apparatus 10 transforms the source task learning data by the transformation rule corresponding to each source task and uses the transformed data in the generation of the classifier. Although the case where the abnormal data is contained in the target task learning data has been described in the embodiment, a case where the abnormal data is not contained in the target task learning data may be presumed. In such a case, the information processing apparatus 10 generates a classifier by falsely using the data, as abnormal data of the source task, obtained by transforming the abnormal data of the source task.

Subsequently, a pattern classifying process for detecting an abnormality in the monitoring area on the basis of the image of the monitoring camera by using the classifier generated by the process of FIG. 3 will be described.

Figure 4:
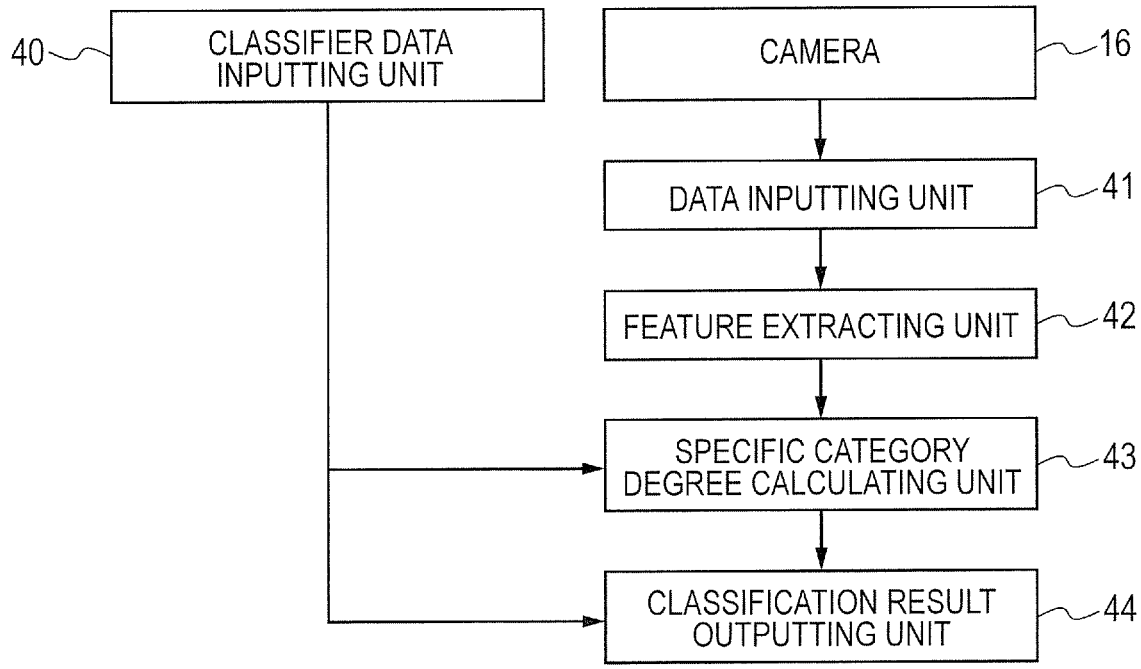
FIG. 4 is a diagram illustrating an example of a function construction and the like of the information processing apparatus.
Figure 5:
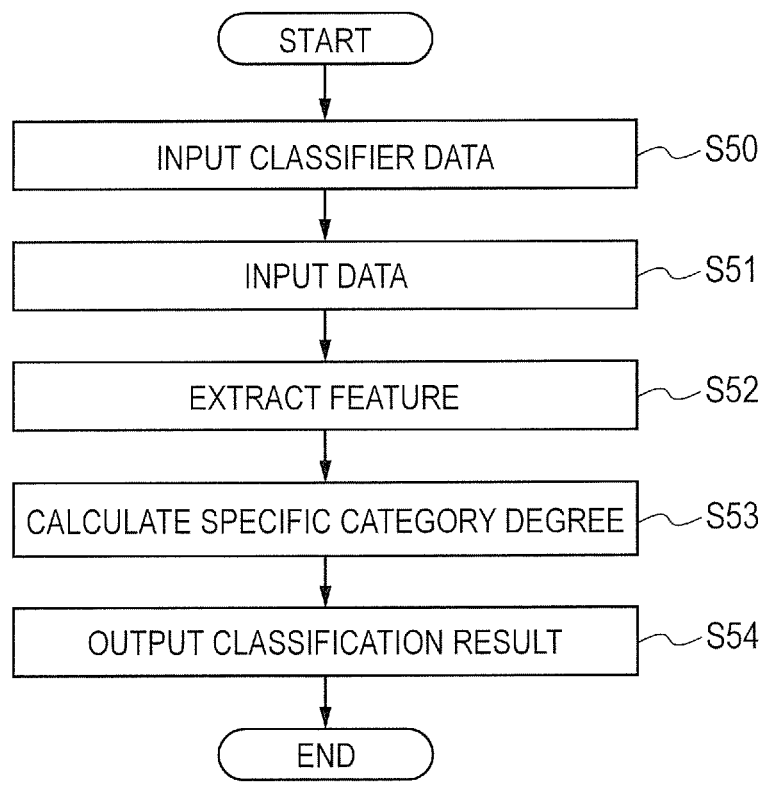
FIG. 5 is a flowchart illustrating an example of a pattern classifying process.

FIG. 4 is a block diagram illustrating an example of a function construction for classifying a pattern in the information processing apparatus 10. FIG. 5 is a flowchart illustrating an example of the pattern classifying process. The pattern classifying process of the embodiment will be described hereinbelow with reference to FIGS. 4 and 5.

The information processing apparatus 10 includes a classifier data inputting unit 40, a data inputting unit 41, a feature extracting unit 42, a specific category degree calculating unit 43, and a classification result outputting unit 44.

The classifier data inputting unit 40 obtains the data of the classifier output by the process of FIG. 3. The data inputting unit 41 obtains the data of the photographed image of the monitoring area from the camera 16. The feature extracting unit 42 extracts a feature amount from the data obtained by the data inputting unit 41. The specific category degree calculating unit 43 calculates a specific category degree (a degree of specific category) showing likelihood of the specific category of the data obtained by the data inputting unit 41 on the basis of the feature amount extracted by the feature extracting unit 42. The classification result outputting unit 44 discriminates whether or not the data obtained by the data inputting unit 41 belongs to the specific category on the basis of the specific category degree calculated by the specific category degree calculating unit 43, and outputs a discrimination result.

Subsequently, a specific processing procedure for classifying the pattern by using the classifier will be described with reference to FIG. 5.

In S50, the classifier data inputting unit 40 executes a process for obtaining the data of the classifier generated by the process of FIG. 3 from the auxiliary storage device 13 or the like. In the present embodiment, the classifier data inputting unit 40 obtains the support vectors of SVM, the coefficients corresponding thereto, and the information of the threshold value. Since the classifier data obtained in S50 is used by the specific category degree calculating unit 43, the classifier data inputting unit 40 transmits the obtained data of the classifier to the specific category degree calculating unit 43. The information of the threshold value which is used for the discrimination about whether the input data of the classifier is the specific category or the non-specific category is used by the classification result outputting unit 44. For this purpose, the classifier data inputting unit 40 transmits such data to the classification result outputting unit 44.

In S51, the data inputting unit 41 executes a process for obtaining the data of the photographed image of the monitoring area as a target for discriminating whether or not an abnormality exists from the camera 16.

In S52, the feature extracting unit 42 extracts the CHLAC in a manner similar to the process of S32 to the data of the photographed image obtained in S51. The feature extracting unit 42 executes the feature extraction to the image data obtained in S51 by the process of S52 and obtains the 251-dimensional feature vector.

In S53, the specific category degree calculating unit 43 calculates a specific category degree by the following expression (8) by using the data of the classifier obtained in S50 and the feature vector extracted in S52.

$$\sum_{i=1}^{N_{SV}} \alpha_{(SV)i} k(x_{(SV)i}, x) \tag{8}$$

In the expression (8), x denotes a 251-dimensional feature vector extracted in S52. Besides, $x_{(SV)i}$ denotes an ith support vector among the $N_{SV}$ support vectors in total and is also a 251-dimensional vector. Besides, $\alpha_{(SV)i}$ denotes a coefficient corresponding to the ith support vector. Besides, k(x, x') denotes a Kernel function (for example, Gaussian kernel or the like) used at the time of the learning of SVM. A specific category degree obtained in S53 is a degree showing likelihood of normality in the embodiment.

In S54, the classification result outputting unit 44 compares the specific category degree calculated in S53 with the threshold value of the classifier obtained in S50. When the specific category degree is larger than the threshold value, the classification result outputting unit 44 determines that the abnormal situation does not occur in the image obtained in S51. When the specific category degree is equal to or smaller than the threshold value, the classification result outputting unit 44 determines that the abnormal situation has occurred in the image obtained in S51. The classification result outputting unit 44 executes a process for outputting a result of the discriminating process of S54. For example, the classification result outputting unit 44 displays the result of the discriminating process of S54 to a displaying unit of the information processing apparatus 10, thereby outputting. The classification result outputting unit 44 finishes the process in FIG. 5. By using the classifier generated in the process in FIG. 3, the information processing apparatus 10 can detect various kinds of abnormalities as compared with the case where the classifier learned by using only a small amount of abnormal data is used.

The pattern classifying process to the one image obtained from the camera 16 has been described in the embodiment. However, by repeating the processes in S51 and subsequent steps in FIG. 5, the information processing apparatus 10 can also execute a process for continuously detecting an abnormality to the images photographed by the camera 16. Although the classification result outputting unit 44 uses the threshold value calculated in S35 as a threshold value for discriminating whether or not the specific category degree is the specific category in S54 in the embodiment, another threshold value may be used. For example, in order to enable the abnormality to be more sensitively detected, the classification result outputting unit 44 may use a value, as a threshold value, obtained by adding the set value to the threshold value calculated in S35.

The example in which the information processing apparatus 10 detects the abnormality in the image photographed by the camera 16 has been described in the embodiment. For example, the information processing apparatus 10 can execute such processes that the image from the camera which does not intend to monitor is input, data obtained by photographing a situation where an event does not particularly occur is replaced to the normal data in the embodiment, and whether or not a specific event has occurred is detected. In this manner, the information processing apparatus 10 can execute not only the discrimination about the normality/abnormality but also another pattern classifying process.

By the processes in the embodiment described above, the information processing apparatus 10 obtains a transformation parameter for transforming the feature amount of the learning data of the source data into the feature amount of the learning data of the target task on the basis of the normal data of the target task of a sufficient amount and the normal data of the source task of a sufficient amount. As described above, the information processing apparatus 10 obtains the transformation parameter which does not depend on the specific data and transforms the learning data of the source task on the basis of the obtained transformation rule. Since the obtained transformation parameter does not depend on the specific data and has a multiplicity, a possibility that the data after the transformation is improper is suppressed. That is, the information processing apparatus 10 can reduce a possibility that the learning data after the transformation becomes improper in the transposition learning.

Even in the case where a sufficient amount of learning data of a negative example in the target task cannot be assured, the information processing apparatus 10 transforms the source abnormal pattern from the learning data of the source task in which the learning data of a negative example of a sufficient amount exists, and uses for the generation of the classifier. Thus, the information processing apparatus 10 can prevent such a situation that the classifier overfits to the learning data of a negative example in the target task.

The information processing apparatus 10 transforms only the learning data of a negative example of the source task and uses, and does not use the learning data of a positive example of the source task. Thus, the information processing apparatus 10 can reduce a possibility of occurrence of such an overlooking that the abnormality is classified as a normality without enlarging a range where the classifier classifies the normality.

Embodiment 2

In the present embodiment, a generating method of a classifier which is used when a defect on the surface of a manufacturing product having a complicated texture pattern is detected as an abnormal pattern from an image obtained by photographing such a surface will be described as a modification of the embodiment 1. In the present embodiment, it is assumed that the information processing apparatus 10 generates a classifier for detecting a defect on the surface of a rubber plate having the rough-finished surface as a manufacturing product having a complicated texture pattern. That is, the target task of the embodiment is to detect the defect on the surface of the rubber plate having the rough-finished surface. However, the information processing apparatus 10 may generate a classifier for detecting a defect on the surface of another substance. It is assumed that a hardware construction of the information processing apparatus 10 of the present embodiment is similar to that in the embodiment 1. The camera 16 of the embodiment is a camera for photographing the surface of the manufacturing product and photographing an image for quality management of the manufacturing product.

Figure 6A:
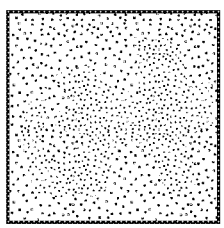
FIGS. 6A, 6B, 6C, 6D, 6E, 6F, 6G, 6H, 6I, and 6J are diagrams illustrating examples of patterns serving as processing targets.
Figure 6B:
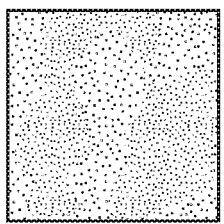
Figure 6C:
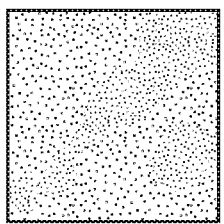
Figure 6D:
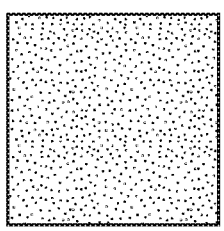
Figure 6E:
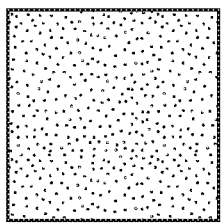
Figure 6F:
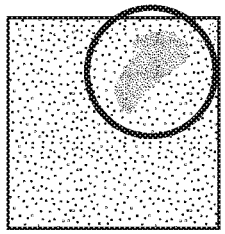
Figure 6G:
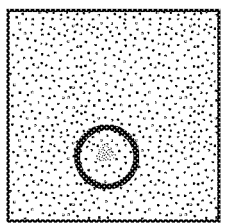
Figure 6H:
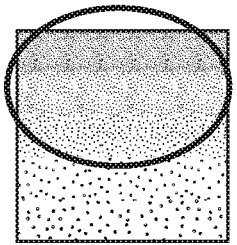
Figure 6I:
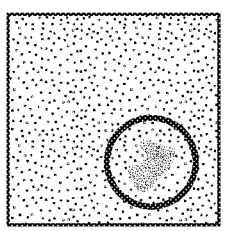
Figure 6J:
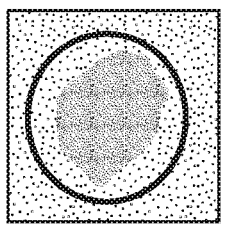

FIGS. 6A to 6J are diagrams illustrating examples of patterns serving as targets of the classifying process by the classifier in the embodiment. Images of FIGS. 6A to 6J are images of regions of (128×128) pixels cut out from a gray scale image obtained by photographing the surface of the rubber plate having the rough-finished surface. FIGS. 6A to 6E are images cut out from the image of the normal rubber plate. FIGS. 6F to 6J are images cut out from the image of the rubber plate including a defect so as to contain a defective portion (in the diagram, shown by a circle). In the present embodiment, it is assumed that the image data of the normal rubber plate as illustrated in FIGS. 6A to 6E is normal data. It is also assumed that the image data containing the defective portion of the rubber plate as illustrated in FIGS. 6F to 6J is abnormal data. FIGS. 6F and 6G show abnormal data in which a defect like a black spot-shaped unevenness exists. There are various shapes and sizes as illustrated in FIGS. 6F and 6G. There are patterns having various kinds of defects such as pattern having a gradation as a whole as illustrated in FIG. 6H, pattern having a white spot-shaped unevenness as illustrated in FIG. 6I, pattern in which a contrast of a texture is partially low as illustrated in FIG. 6J, and the like. In the present embodiment, the information processing apparatus 10 generates such a classifier that when the image data as illustrated in FIGS. 6A to 6E is given, it is determined that the image data is normal data, and when the image data as illustrated in FIGS. 6F to 6J is given, it is determined that the image data is abnormal data.

Figure 7:
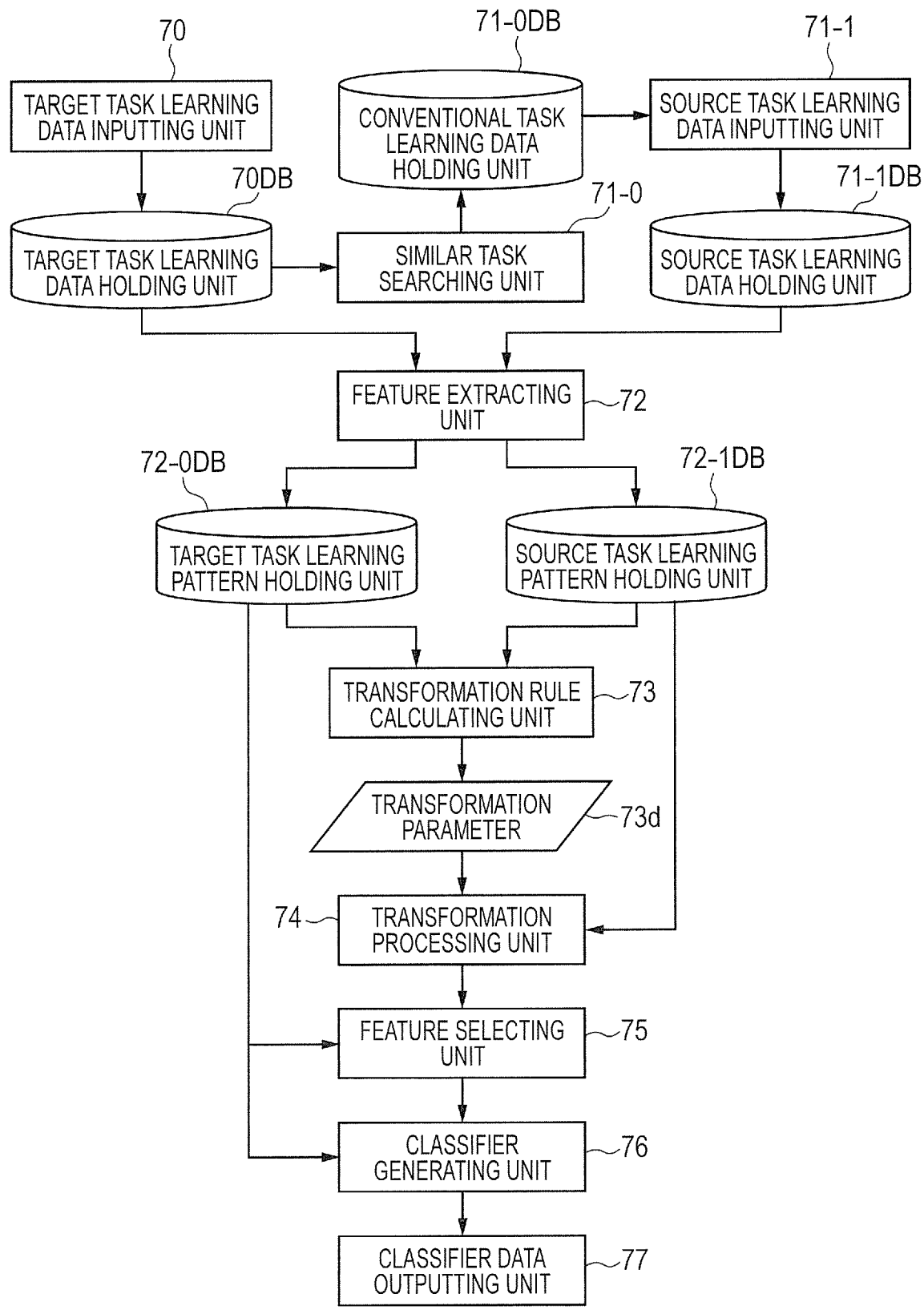
FIG. 7 is a diagram illustrating an example of a function construction and the like of the information processing apparatus.
Figure 8:
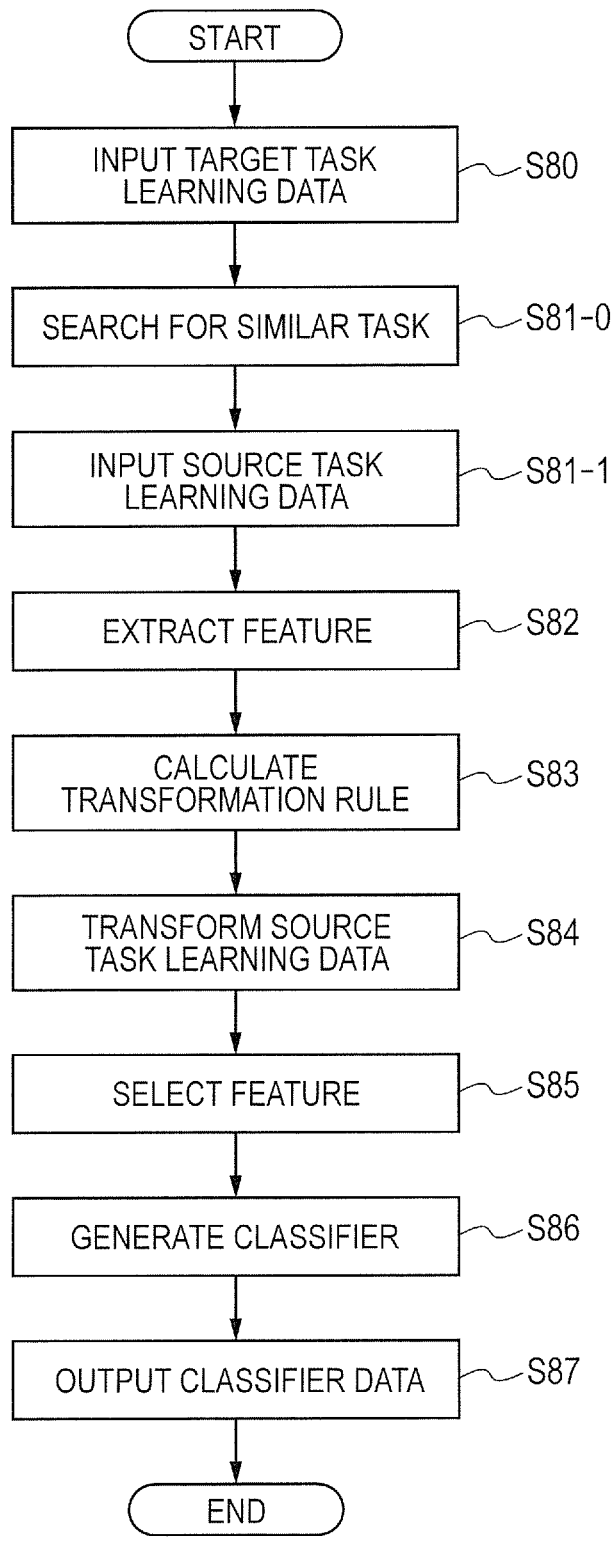
FIG. 8 is a flowchart illustrating an example of a classifier generating process.

FIG. 7 is a block diagram illustrating an example of a function construction and the like for generating the classifier in the information processing apparatus 10 of the embodiment. FIG. 8 is a flowchart illustrating an example of a classifier generating process. The classifier generating process of the embodiment will be described hereinbelow with reference to FIGS. 7 and 8. In the present embodiment, points different from the embodiment 1 will be described.

The information processing apparatus 10 includes a target task learning data inputting unit 70, a target task learning data holding unit 70DB, a similar task searching unit 71-0, a conventional task learning data holding unit 71-0DB, a source task learning data inputting unit 71-1, and a source task learning data holding unit 71-1DB. The information processing apparatus 10 also includes a feature extracting unit 72, a target task learning pattern holding unit 72-0DB, a source task learning pattern holding unit 72-1DB, a transformation rule calculating unit 73, a transformation processing unit 74, a feature selecting unit 75, a classifier generating unit 76, and a classifier data outputting unit 77.

The target task learning data inputting unit 70 obtains learning data of a target task from the camera 16, the auxiliary storage device 13, or the like.

The target task learning data holding unit 70DB is a database for holding the learning data obtained by the target task learning data inputting unit 70 and is installed in the auxiliary storage device 13.

The similar task searching unit 71-0 searches for a task in which the learning data is similar to the target task from the tasks of a plurality of conventional task learning data.

The conventional task learning data holding unit 71-0DB is a database for holding the conventional task learning data and is installed in the auxiliary storage device 13. The conventional task learning data will be described hereinafter.

The source task learning data inputting unit 71-1 obtains the learning data, as source task learning data, searched for by the similar task searching unit 71-0 among the plurality of conventional task learning data held in the conventional task learning data holding unit 71-0DB.

The source task learning data holding unit 71-1DB is a database for holding the source task learning data obtained by the source task learning data inputting unit 71-1 and is installed in the auxiliary storage device 13.

The feature extracting unit 72 extracts features from the learning data held in the target task learning data holding unit 70DB and the source task learning data holding unit 71-1DB.

The target task learning pattern holding unit 72-0DB is a database for holding data of a feature amount extracted by the feature extracting unit 72 from the learning data held in the target task learning data holding unit 70DB and is installed in the auxiliary storage device 13.

The source task learning pattern holding unit 72-1DB is a database for holding data of a feature amount extracted by the feature extracting unit 72 from the learning data held in the source task learning data holding unit 71-1DB and is installed in the auxiliary storage device 13.

The transformation rule calculating unit 73 calculates a transformation rule for transforming the feature amount of the learning data of the source task into the feature amount of the learning data of the target task on the basis of the data of the feature amounts held in the target task learning pattern holding unit 72-0DB and the source task learning pattern holding unit 72-1DB. The transformation processing unit 74 transforms the data of the feature amount held in the source task learning pattern holding unit 72-1DB into the feature amount of the learning data of the target task on the basis of the transformation rule calculated by the transformation rule calculating unit 73.

The feature selecting unit 75 selects the feature amount which is used for the generation of the classifier from the feature amount transformed by the transformation processing unit 74 and the feature amount held in the target task learning data holding unit 70DB.

The classifier generating unit 76 generates the classifier on the basis of the feature amount selected by the feature selecting unit 75.

The classifier data outputting unit 77 outputs data of the classifier generated by the classifier generating unit 76. For example, the classifier data outputting unit 77 stores data of the classifier into the auxiliary storage device 13, thereby outputting.

Subsequently, a specific processing procedure for generating the classifier will be described with reference to FIG. 8.

In S80, the target task learning data inputting unit 70 obtains the learning data of the target task which is used for the generation of the classifier from the camera 16, the auxiliary storage device 13, or the like. In the embodiment, the target task learning data inputting unit 70 obtains a plurality of image data, as learning data of the target task, in which the surface of the rubber plate has been photographed as illustrated in FIGS. 6A to 6J. In the present embodiment, in S80, the target task learning data inputting unit 70 obtains the Nt image data (normal data) having no defects as illustrated in FIGS. 6A to 6E and the Mt image data (abnormal data) in which some defects exist as illustrated in FIGS. 6F to 6J. The target task learning data inputting unit 70 records the obtained data into the target task learning data holding unit 70DB. Although the Mt abnormal data is obtained in the embodiment, no abnormal data may be obtained (Mt=0).

In S81-0, the similar task searching unit 71-0 executes such a process that a task in which the learning data similar to that of the target task is searched for from the tasks of a plurality of conventional task learning data on the basis of the target task learning data obtained in S80. The conventional task learning data is learning data of every task consisting of the normal data and the abnormal data obtained by photographing the surface of another manufacturing produce in the past in a manner similar to the target task learning data. First, in the present embodiment, the similar task searching unit 71-0 executes a process for searching for learning data in which distribution of pixel values of the normal data of the conventional task learning data is similar to distribution of pixel values in the normal data of the target task learning data. For example, the similar task searching unit 71-0 obtains the distribution of the pixel values with respect to the normal data in each conventional task learning data, and decides a similarity degree which is inversely proportional to a magnitude of a difference between the obtained distribution and the distribution of the pixel values of the normal data of the target task learning data. Such a similarity degree is an index showing to which extent each conventional task learning data is similar to the target task learning data. The similar task searching unit 71-0 calculates an average value of the similarity degrees every task and searches for a task in which the calculated average value is equal to or larger than a threshold value, as a task similar to the target task.

Although the similar task searching unit 71-0 searches for the task in which the distribution of the pixel values of the normal data is similar in the embodiment, for example, a task of the learning data in which a texture feature amount based on Co-occurrence Matrix is similar may be searched for, or the like. However, it is desirable to search for the similar task on the basis of a similarity between the normal data. The similar task searching unit 71-0 may obtain not only the information of the image data but also, for example, raw material information of the manufacturing product or information of manufacturing steps and search for the similar task by using such information. As described above, in the present embodiment, from a plurality of conventional task learning data, the similar task searching unit 71-0 searches for the conventional task similar to the target task on the basis of the similarity of the learning data. However, for example, if the target task corresponds to a change in manufacturing steps of the manufacturing product or the like, the similar task searching unit 71-0 may use the data before the manufacturing steps are changed.

In S81-1, the source task learning data inputting unit 71-1 executes such a process that the learning data belonging to the conventional task searched for in S81-0 is obtained as source task learning data from the conventional task learning data holding unit 71-0DB. In the present embodiment, as source task learning data, the source task learning data inputting unit 71-1 obtains the Ns normal data and the Ms abnormal data. The source task learning data inputting unit 71-1 records the obtained learning data into the source task learning data holding unit 71-1DB.

In S82, the feature extracting unit 72 extracts features from the learning data obtained in S80 and S81-1. In the present embodiment, d kinds (for example, about 30 kinds) of feature amounts such as average value of the pixel values, dispersion, and maximum value are extracted from each image obtained in S80 and S81-1. The feature extracting unit 72 sets an array of the d kinds of feature amounts extracted from each image data into a d-dimensional feature vector. The feature extracting unit 72 records the feature vector extracted from the data obtained in S80 into the target task learning pattern holding unit 72-0DB. The feature extracting unit 72 also sets the feature vector extracted from the data obtained in S81-1 into the source task learning pattern holding unit 72-1DB. Hereinbelow, it is assumed that the d-dimensional vector which had been extracted from the normal data of the target task learning data and was recorded in the target task learning pattern holding unit 72-0DB is a target normal pattern and the d-dimensional vector which had been extracted from the abnormal data of the target task learning data and was recorded in the target task learning pattern holding unit 72-0DB is a target abnormal pattern. It is also assumed that the d-dimensional vector which had been extracted from the normal data of the source task learning data and was recorded in the source task learning pattern holding unit 72-1DB is a source normal pattern and the d-dimensional vector which had been extracted from the abnormal data of the source task learning data and was recorded in the source task learning pattern holding unit 72-1DB is a source abnormal pattern.

In S83, the transformation rule calculating unit 73 executes a process for obtaining a transformation rule for transforming the source task learning data into the target task learning data by a process similar to that of S33. Also in the present embodiment, in a manner similar to the embodiment 1, the transformation rule calculating unit uses the target normal pattern and the source normal pattern as data of the specific category and adjusts values of transformation parameters (the matrix A and the bias vector b) for such a linear transformation as to locally minimize a difference between their distribution. In the present embodiment, since each pattern is a d-dimensional vector, the matrix A is a square matrix of degree d and the bias vector b is a d-dimensional vector. The data of the matrix A and the bias vector b obtained in S83 is assumed to be a transformation parameter 73*d*.

In S84, the transformation processing unit 74 executes a process for transforming the Ms source abnormal patterns extracted in feature extracting step S52 in a manner similar to S34. Unlike the embodiment 1, since the source abnormal patterns transformed in S84 are used for the feature selecting process by the feature selecting unit 75, the transformation processing unit 74 transmits the transformed source abnormal patterns to the feature selecting unit 75.

In S85, the feature selecting unit 75 executes a feature selecting process by using the Nt target normal patterns, the Mt target abnormal patterns, and the Ms source abnormal patterns transformed in S84. In the present embodiment, the feature selecting unit 75 uses the feature selecting method disclosed in Japanese Patent No. 5414416 as a feature selecting method. By this process, the feature selecting unit 75 selects d' (d'<d) feature amounts which are considered to be valid from d feature amounts serving as elements of each pattern. The feature selecting unit 75 transmits information showing a type of the selected d' feature amounts to the classifier generating unit 76. As described above, the information processing apparatus 10 can execute not only the generation of the classifier but also another information process such as a feature selecting process. As described above, such a process that the feature selecting process is executed and a process for generating the classifier by using only the selected elements among the elements of the feature vector can be also executed.

In S86, the classifier generating unit 76 generates the classifier by using only the d' features selected in feature selecting step S55 among the target normal patterns. In the present embodiment, the information processing apparatus 10 uses 1-class SVM as a classifier. Therefore, for the generation of the classifier, the classifier generating unit 76 generates the classifier by using only the target normal patterns without using the abnormal patterns. The classifier generating unit 76 transmits a plurality of support vectors obtained as a learning result, the coefficients corresponding thereto, and the threshold value to the classifier data outputting unit 77. Although the classifier generating unit 76 generates the classifier by using only the target normal patterns in the embodiment, in a manner similar to the embodiment 1, a 2-class classifier may be generated also by using the target abnormal patterns and the transformed source abnormal patterns.

In S87, the classifier data outputting unit 77 outputs the plurality of support vectors obtained in S86, the coefficients corresponding thereto, and the data of the threshold value and finishes the process of FIG. 8. For example, the classifier data outputting unit 77 records the plurality of support vectors obtained in S86, the coefficients corresponding thereto, and the data of the threshold value into the auxiliary storage device 13, thereby outputting.

Subsequently, such a process that from an image obtained by photographing such a surface of a rubber plate serving as a manufacturing product having a complicated texture pattern, a defect on such a surface is detected as an abnormal pattern by using the classifier generated by the process of FIG. 8 will be described.

Figure 9:
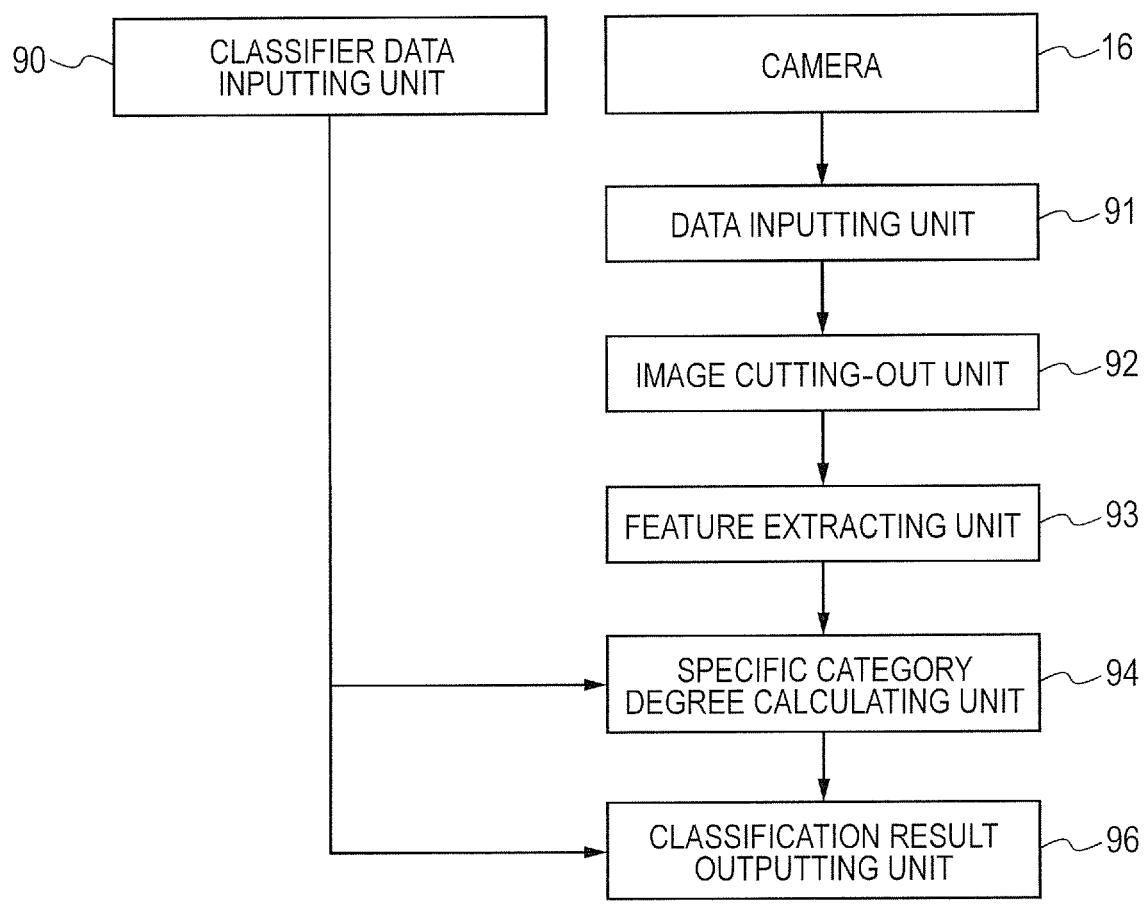
FIG. 9 is a diagram illustrating an example of a function construction and the like of the information processing apparatus.
Figure 10:
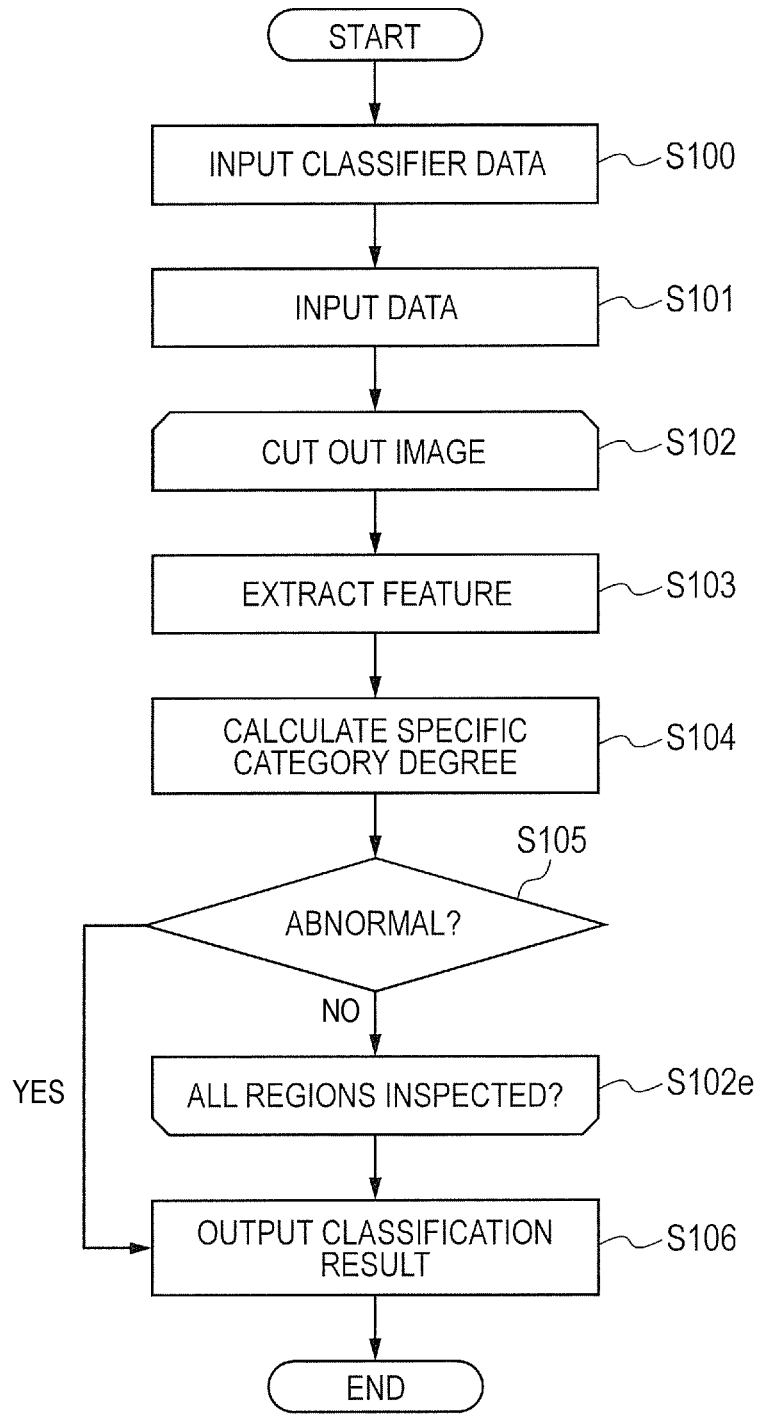
FIG. 10 is a flowchart illustrating an example of a pattern classifying process.

FIG. 9 is a block diagram illustrating an example of a function construction and the like for executing a pattern classifying process in the information processing apparatus 10. FIG. 10 is a flowchart illustrating an example of the pattern classifying process. The pattern classifying process of the embodiment will be described hereinbelow with reference to FIGS. 9 and 10.

The information processing apparatus 10 includes a classifier data inputting unit 90, a data inputting unit 91, an image cutting-out unit 92, a feature extracting unit 93, a specific category degree calculating unit 94, and a classification result outputting unit 96.

The classifier data inputting unit 90 obtains data of the classifier output by the process of FIG. 8. The data inputting unit 91 obtains data of the photographed image of the surface of the rubber plate from the camera 16. The image cutting-out unit 92 cuts out a part of the image corresponding to the data obtained by the data inputting unit 91 and outputs the data of the cut-out image. The feature extracting unit 93 extracts a feature amount from the data output by the image cutting-out unit 92. The specific category degree calculating unit 94 calculates a specific category degree showing likelihood of the specific category of the data obtained by the data inputting unit 91 on the basis of the feature amount extracted by the feature extracting unit 93. The classification result outputting unit 96 discriminates whether or not the data obtained by the data inputting unit 91 belongs to the specific category on the basis of the specific category degree calculated by the specific category degree calculating unit 94, and outputs a discrimination result.

Subsequently, a specific processing procedure for classifying the pattern by using the classifier will be described with reference to FIG. 10.

In S100, the classifier data inputting unit 90 obtains the plurality of support vectors, the coefficients corresponding thereto, and the information of the threshold value as data of the classifier output by the process of FIG. 8 from the auxiliary storage device 13 or the like. The classifier data inputting unit 90 transmits the information of the plurality of support vectors and the coefficients corresponding thereto to the specific category degree calculating unit 94 and transmits the information of the threshold value to the classification result outputting unit 96.

In S101, the data inputting unit 91 obtains the photographed image, from the camera 16, of the surface of the manufacturing product (rubber plate) as a target of the discrimination about the existence of the abnormality. In the present embodiment, the data inputting unit 91 executes a process for obtaining a monochromatic image of (256×256) pixels obtained by photographing the surface of the rubber plate by the camera 16.

In S102, the image cutting-out unit 92 cuts out the image of (128×128) pixels of the same size as the image size of the target task learning data from the image obtained in S101. The image cutting-out unit 92 transmits the cut-out image to the feature extracting unit 93. In the present embodiment, since the image obtained in S101 is an image of (256×256) pixels, the image cutting-out unit 92 cuts out the image into four regions of a size of (128×128) pixels. With respect to each of the cut-out images, the information processing apparatus 10 discriminates whether or not the abnormality exists.

In S103, the feature extracting unit 93 executes the feature extracting process to the image of (128×128) pixels cut out in S102. In this instance, the process for extracting the d' feature amounts selected in S85 is executed.

In S104, the specific category degree calculating unit 94 calculates a specific category degree by using an expression similar to the expression (8) to the d' feature amounts extracted in S103. The specific category degree is a numerical value showing likelihood of normality. The smaller such a numerical value is, the higher a possibility of the abnormality is.

In S105, the specific category degree calculating unit 94 discriminates whether or not there is an abnormality on the basis of a result of the discrimination about whether or not the specific category degree calculated in S104 is equal to or less than the threshold value. If it is determined that the abnormality exists, the specific category degree calculating unit 94 advances to a process of S106. If it is determined that there is no abnormality, the specific category degree calculating unit 94 advances to a process of S102e.

In S102e, the specific category degree calculating unit 94 discriminates whether or not the process has been executed to all regions of the image obtained in S102. If it is determined that the process has been executed to all regions, the processing routine advances to a process of S106. If it is determined that the process is not executed to all regions, the processing routine advances to a process of S102.

If it is determined in S105 that there is the abnormality, in S106, the classification result outputting unit 96 outputs a discrimination result showing that the abnormality exists in the input image. If there is no abnormality, the classification result outputting unit 96 outputs a discrimination result showing that the input image is normal, and finishes the process of FIG. 10. For example, the classification result outputting unit 96 displays information showing the discrimination result about the abnormality to a displaying unit (not shown) of the information processing apparatus 10, thereby outputting.

As described above, by the processes of the embodiment, the information processing apparatus 10 can generate the classifier by using only the feature amounts selected by the feature selecting unit 75 among the feature amounts obtained by transforming the feature amounts of the learning data of the source task. Thus, the information processing apparatus 10 generates the classifier using only the feature amounts which more largely contribute to the classification, and can execute the classifying process by using the generated classifier by using only the feature amounts which more largely contribute to the classification extracted from the input data. Since an amount of data which is used at the time of the classifying process decreases, the information processing apparatus 10 can reduce a load of the process. As shown in the embodiment, the information processing apparatus 10 can execute such processes that the similar task is searched for from the conventional tasks and the learning data of such a task is used as source task learning data. Such a method is effective in the case where the similar task is unclear. On the other hand, for example, in the case of a correspondence to a change in materials of the manufacturing product or the like, a possibility that the task before the change is most similar to the target task is high. Therefore, it is desirable that the information processing apparatus 10 uses the learning data of the task before the change as source task learning data.

Embodiment 3

In the present embodiment, as a modification of the embodiment 1, a process for generating a classifier in the pattern classifying method of detecting an abnormality in a monitoring area on the basis of a motion image of a monitoring camera will be described.

In the embodiment 1, when a transformation rule is obtained, the information processing apparatus 10 obtains the transformation rule on the basis of such a reference as to decrease an estimation value of the L2 distance between the distributions of the normal data of different tasks. On the other hand, in the present embodiment, the information processing apparatus 10 obtains the transformation rule on the basis of such a reference as to decrease an estimation value of a relative Pearson distance between the distributions.

It is now assumed that a hardware construction and a function construction of the information processing apparatus 10 of the present embodiment are similar to those of the embodiment 1.

A classifier generating process of the embodiment will be described with reference to FIGS. 2 and 3. In the present embodiment, portions different from the embodiment 1 will be described.

By processes of S30 to S32, Nt 251-dimensional vectors are recorded as target normal patterns into the target task learning pattern holding unit 22-0DB and Mt 251-dimensional vectors are recorded as target abnormal patterns are recorded into the target task learning pattern holding unit 22-0DB. Ns 251-dimensional vectors are recorded as source normal patterns into the source task learning pattern holding unit 22-1DB and Ms 251-dimensional vectors are recorded as source abnormal patterns into the source task learning pattern holding unit 22-1DB.

In S33, the transformation rule calculating unit 23 obtains a transformation rule for transforming the source task abnormal patterns so that they can be used for the generation of the classifier by using the specific category data of each learning data, that is, a plurality of target normal patterns and a plurality of source normal patterns. Also in the present embodiment, a linear transformation is used as a transformation here in a manner similar to the embodiment 1. However, although the transformation rule calculating unit 23 obtains such a transformation as to locally minimize the estimation value of the L2 distance between the distributions in the embodiment 1, in the present embodiment, the transformation rule calculating unit 23 obtains such a transformation as to locally minimize the estimation value of the relative Pearson distance between the distributions as disclosed in Makoto Yamada, Taiji Suzuki, Takafumi Kanamori, Hirotaka Hachiya and Masashi Sugiyama, "Relative Density-Ratio Estimation for Robust Distribution Comparison", Advances in Neural Information Processing Systems 24, pp. 594-602, 2011.

In a manner similar to the embodiment 1, now assuming that distribution of the target normal patterns is equal to x and distribution of the source normal patterns after they were transformed by the bias vector b is equal to x', an estimation value rPE(x,x') of the relative Pearson distance is obtained by the following equation (9).

$$rPE(\chi, \chi') = -\frac{1}{2}\theta^T H \theta + h^T \theta - \frac{1}{2} \qquad (9)$$

Although the estimation value of the relative Pearson distance is almost similar to the estimation value of the L2 distance of the equation (1), a definition of h and H in the equation (9) differs from that of the equation (1) and they are defined as shown by the following equations (10) and (11).

$$h = \left(h_k = \frac{1}{Nt}\sum_{i=1}^{Nt}\exp\left(-\frac{|x_i - x_k|^2}{2\sigma^2}\right)\right)_{1 \leq k \leq Nt} \qquad (10)$$

$$H = \left(H_{u,v} = \frac{\beta}{Nt}\sum_{i=1}^{Nt}\exp\left(-\frac{|x_i - x_u|^2 + |x_i - x_v|^2}{2\sigma^2}\right) + \right.$$

$$\left. \frac{(1-\beta)}{Ns}\sum_{j=1}^{Ns}\exp\left(-\frac{|x'_j - x_u|^2 + |x'_j - x_v|^2}{2\sigma^2}\right)\right)_{1 \leq u,v \leq Nt} \qquad (11)$$

In a manner similar to the embodiment 1, $x_i$ denotes the ith target normal pattern and $x_j'$ indicates the jth source normal pattern. Although a definition of θ in the equation (9) is similar to that of θ in the equation (4) shown in the embodiment 1, since the definition of h and H differs, θ is an Nt-dimensional vector. Besides, σ denotes the parameter of the Gaussian basic function, λ indicates the regularlization parameter, and I denotes the unit matrix of degree Nt. Besides, β in the equation (11) is the distribution mixture parameter of 0≤β<1 and is equal to, for example, β=0.5 or the like.

Also in the present embodiment, in a manner similar to the embodiment 1, proper initial values are set into the matrix A and the bias vector b and are updated based on the equation in which the equation showing the estimation value of the relative Pearson distance shown in the equation (9) is differentiated by the parameter corresponding to the matrix A and the bias vector b. The equation in which the estimation value of the relative Pearson distance shown in the equation (9) is differentiated by the transformation parameter a is obtained as shown by the following equation (12).

$$\frac{\partial rPE(\chi, \chi')}{\partial a} = \frac{1}{2}h^T(H + \lambda I)^{-1}\{2\lambda(H + \lambda I)^{-1} - I\}\frac{\partial H}{\partial a}(H + \lambda I)^{-1}h \qquad (12)$$

The transformation rule calculating unit 23 updates, by using the equation (12), the component $a_{rc}$ of r-row and c-column of the matrix A and the cth element $b_c$ of the bias vector b in accordance with the following equations (13) and (14).

$$a_{r,c}^{new} = a_{r,c}^{old} - \eta\frac{\partial rPE(\chi, \chi')}{\partial a_{r,c}} \qquad (13)$$

$$b_c^{new} = b_c^{old} - \eta\frac{\partial rPE(\chi, \chi')}{\partial b_c} \qquad (14)$$

In the equations (13) and (14), η denotes the learning coefficient similar to that in the first embodiment. Also in the present embodiment, in a manner similar to the embodiment 1, the updating by the equations (13) and (14) is repeated until the relative Pearson distance after the values of the matrix A and the bias vector b were updated and the learning coefficient η are smaller than the set threshold values. In this manner, the transformation rule calculating unit 23 obtains the matrix A for the transformation and the bias vector b. Processes of S34 to S36 are similar to those in the embodiment 1.

As described above, the information processing apparatus 10 can calculate the transformation parameter which is used for the transformation of the learning data even by locally minimizing the estimation value of the relative Pearson distance between the distributions instead of the estimation value of the L2 distance between the distributions.

By the processes of the embodiment, the information processing apparatus 10 can cope with the case where it is suitable to perform such a transformation as to decrease the relative Pearson distance between the distributions.

Embodiment 4

In the present embodiment, there is shown a generating method of a classifier which is used in a method whereby an image of a face of a person is input and whether or not the person in the image is a predetermined specific person. In the present embodiment, the classifier is generated so as to reduce a possibility that even when an image of the face of the person different from the specific person serving as a target does not exist, the classifier erroneously determines that the image of the face of the different person is a specific person.

It is assumed that a hardware construction of the information processing apparatus 10 of the embodiment is similar to that in the embodiment 1.

Figure 11:
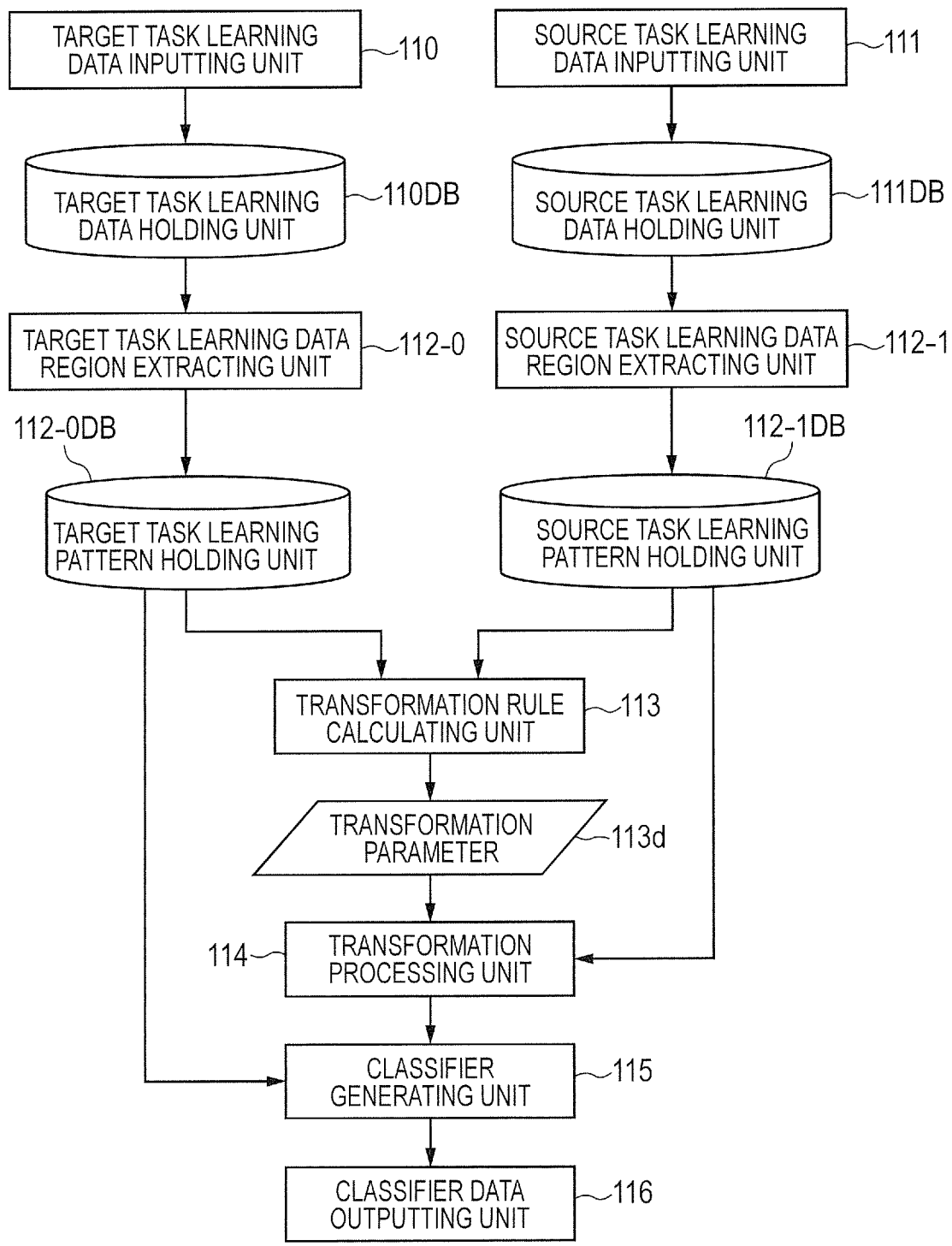
FIG. 11 is a diagram illustrating an example of a function construction and the like of the information processing apparatus.
Figure 12:
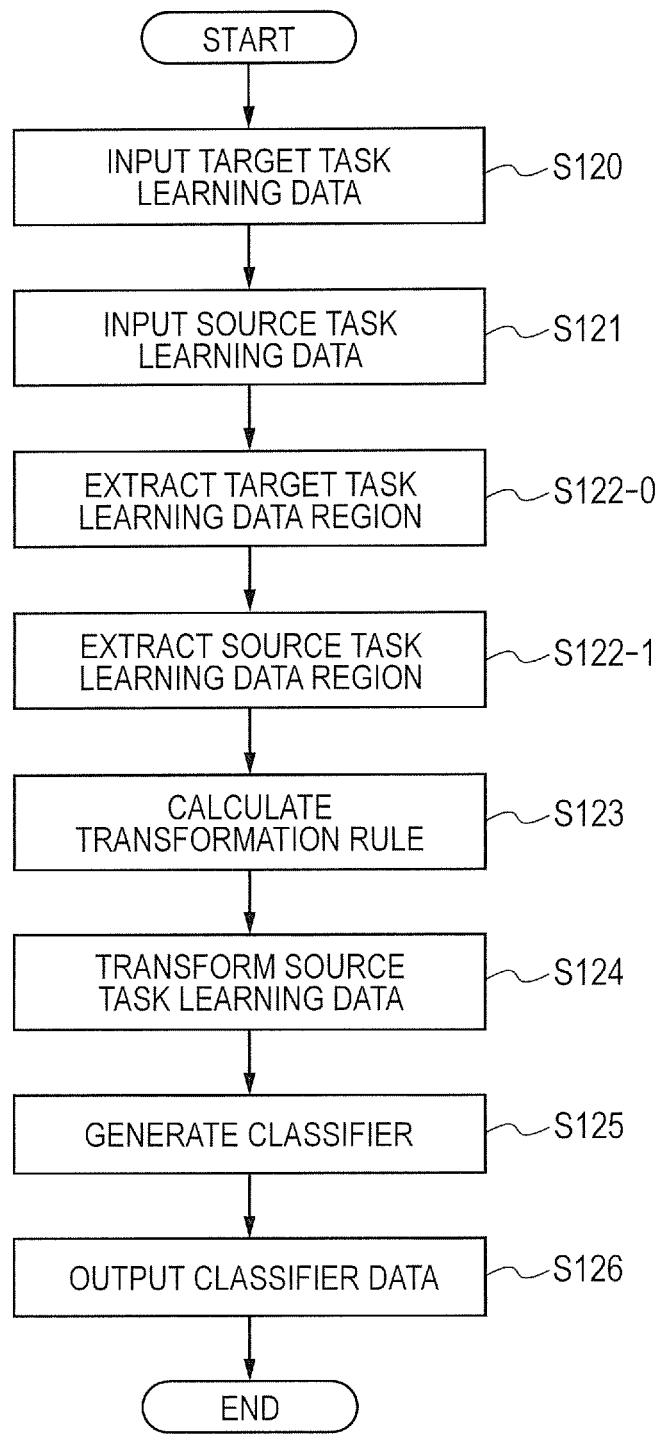
FIG. 12 is a flowchart illustrating an example of a classifier generating process.

FIG. 11 is a block diagram illustrating an example of a function construction and the like for generating a classifier in the information processing apparatus 10 of the embodiment. FIG. 12 is a flowchart illustrating an example of a classifier generating process. The classifier generating process of the embodiment will be described hereinbelow with reference to FIGS. 11 and 12.

The information processing apparatus 10 includes a target task learning data inputting unit 110, a source task learning data inputting unit 111, a target task learning data holding unit 110DB, and a source task learning data holding unit 111DB. The information processing apparatus 10 also includes a target task learning data region extracting unit 112-0, a target task learning pattern holding unit 112-0DB, a source task learning data region extracting unit 112-1, a source task learning pattern holding unit 112-1DB, a transformation rule calculating unit 113, and a transformation processing unit 114. The information processing apparatus 10 also includes a classifier generating unit 115 and a classifier data outputting unit 116. The target task learning data inputting unit 110 obtains learning data of the target task from the camera 16, the auxiliary storage device 13 or the like. The source task learning data inputting unit 111 obtains learning data of the source task from the camera 16, the auxiliary storage device 13, or the like.

The target task learning data holding unit 110DB is a database for holding the learning data obtained by the target task learning data inputting unit 110 and is installed in the auxiliary storage device 13.

The source task learning data holding unit 111DB is a database for holding the learning data obtained by the source task learning data inputting unit 111 and is installed in the auxiliary storage device 13.

The target task learning data region extracting unit 112-0 detects the face of the person from the image obtained by the target task learning data inputting unit 110, extracts a set region in the detected face, and obtains a feature amount from the extracted region. The source task learning data region extracting unit 112-1 detects the face of the person from the image obtained by the source task learning data inputting unit 111, extracts a set region in the detected face, and obtains a feature amount from the extracted region.

The target task learning pattern holding unit 112-0DB is a database for holding information of the feature amount obtained from the region extracted by the target task learning data region extracting unit 112-0 and is installed in the auxiliary storage device 13. The source task learning pattern holding unit 112-1DB is a database for holding information of the feature amount obtained from the region extracted by the source task learning data region extracting unit 112-1 and is installed in the auxiliary storage device 13.

The transformation rule calculating unit 113 calculates a transformation rule for transforming a feature amount of the learning data of the source task into a feature amount of the learning data of the target task on the basis of data of feature amounts held in the target task learning pattern holding unit 112-0DB and the source task learning pattern holding unit 112-1DB.

The transformation processing unit 114 transforms the data of the feature amount held in the source task learning pattern holding unit 112-1DB into the feature amount of the learning data of the target task on the basis of the transformation rule calculated by the transformation rule calculating unit 113.

The classifier generating unit 115 generates a classifier on the basis of data of the feature amount held in the target task learning pattern holding unit 112-0DB and data of the feature amount transformed by the transformation processing unit 114.

The classifier data outputting unit 116 outputs data of the classifier generated by the classifier generating unit 115. For example, the classifier data outputting unit 116 records the data of the classifier into the auxiliary storage device 13, thereby outputting.

Subsequently, a specific processing procedure for generating the classifier will be described with reference to FIG. 12.

In S120, the target task learning data inputting unit 110 obtains a plurality of learning data which is used for the generation of the classifier from the camera 16, the auxiliary storage device 13, or the like. In the present embodiment, the target task learning data inputting unit 110 obtains face images of a plurality of persons as a plurality of learning data. More specifically speaking, in the present embodiment, the target task learning data inputting unit 110 obtains a gray scale image of (40×40) pixels in which the region of the face of the person has been cut out. It is assumed hereinbelow that the gray scale image of (40×40) pixels in which the region of the face of the person has been cut out is a face image. As target task learning data, the target task learning data inputting unit 110 obtains a face image of a predetermined specific person (assumed to be a person A) and a face image of an arbitrary person other than the person A. However, it is assumed that a face image of a person different from the person A although it is similar to the face image of the person A does not exist in the face image of the person other than the person A. The target task learning data inputting unit 110 records data of the obtained face image into the target task learning data holding unit 110DB.

In S121, the source task learning data inputting unit 111 obtains a plurality of face images of each of a certain person (assumed to be a person B) different from the person A and a person (assumed to be a person B') similar to the person B from the camera 16, the auxiliary storage device 13, or the like. In the present embodiment, the information processing apparatus 10 uses the data obtained in S121 as source task learning data. The source task learning data inputting unit 111 records the obtained data of the face images as source task learning data into the source task learning data holding unit 111DB.

Figure 13A:
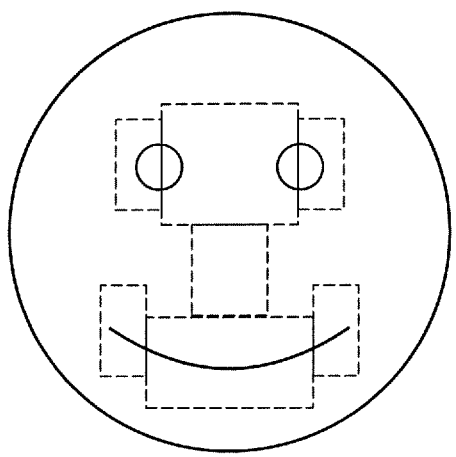
FIGS. 13A and 13B are diagrams illustrating examples of region extraction areas.

In S122-0, the target task learning data region extracting unit 112-0 executes such a process that to each of all of the face images obtained in S120, pixel values are extracted from local regions set in the face image and vector data in which the extracted pixel values are arranged is generated. In the present embodiment, the local regions set in the face image are regions as illustrated by rectangular regions in FIG. 13A. The target task learning data region extracting unit 112-0 extracts the pixel values of each region and generates a vector in which such pixel values are arranged with respect to each image. Now assuming that the total number of pixels in all of the rectangular regions is equal to d, the vector which is generated here becomes a di-dimensional vector. The target task learning data region extracting unit 112-0 records the generated vector into the target task learning pattern holding unit 112-0DB. It is now assumed that the vector generated based on the face image of the person A is a target specific person pattern and the vector generated based on the face image of a person other than the person A is a target non-specific person pattern.

Figure 13B:
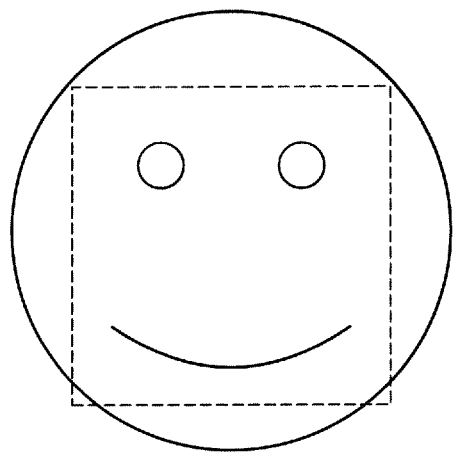

In S122-1, the source task learning data region extracting unit 112-1 executes the following processes to each of all of the face images obtained in S121. That is, the source task learning data region extracting unit 112-1 executes such processes that pixel values are extracted from a rectangular region (as illustrated in FIG. 13B) larger than each of the rectangular regions in FIG. 13A set in a center portion of the face and a vector in which the extracted pixel values are arranged is generated. Now assuming that the number of pixels in the rectangular region in FIG. 13B is equal to d', the vector which is generated here becomes a d'-dimensional vector. Although a size of rectangular region is an arbitrary size, the larger an information amount on the source task learning data side is, the higher a possibility that the task can be properly transformed into the target task is. Therefore, it is desirable to set d'>d. The source task learning data region extracting unit 112-1 records the generated vector into the source task learning pattern holding unit 112-1DB. It is assumed here that the vector generated based on the face image of the person B is a source reference person pattern corresponding to the target specific person pattern and the vector generated based on the face image of the person B' is a source non-specific person pattern. In the present embodiment, the target specific person pattern in the target task and the source reference person pattern in the source task become data of the specific category.

In S123, the transformation rule calculating unit 113 executes the following processes by using the data of the specific category of the learning data, that is, a plurality of target specific person patterns and a plurality of source reference person patterns. That is, the transformation rule calculating unit 113 executes a process for obtaining a transformation rule for transforming the source non-specific person pattern so that it can be used for the generation of the classifier. Also in the present embodiment, although the transformation is a linear transformation, unlike another embodiment, since a dimension of the transformation destination and a dimension of the transformation source differ, the matrix A as a transformation parameter is not a square matrix. In the present embodiment, since the dimension of the transformation destination is d-dimensional and the dimension of the transformation source is d'-dimensional, the matrix A of the linear transformation is a matrix of d'-row and d-column, and the bias vector b is a d-dimensional vector. Also in the present embodiment, the transformation rule calculating unit 113 obtains the matrix A and the bias vector b on the basis of such a reference as to decrease the estimation value of the L2 distance in a manner similar to the embodiment 1. However, even if the dimension of the vector of the transformation destination and that of the transformation source differ like the present embodiment, the transformation rule can be obtained. Even if a dimension of the vector of the feature amount of the learning data of the target task and a dimension of the vector of the feature amount of the learning data of the source task differ, the information processing apparatus 10 can obtain the transformation rule and transform. The process of S123 is similar to that in the embodiment 1 except that only the number of elements of the matrix differs. It is assumed that the matrix A and the bias vector b obtained in S123 are a transformation parameter 113d.

In S124, the transformation processing unit 114 executes a process for transforming a plurality of source non-specific person patterns by the transformation rule obtained in S123. In this process, the source non-specific person patterns, that is, the data of the person B' different from the person B is transformed by such a transformation rule as to locally minimize a difference between the distribution of the data of the person A and the distribution of the data of the person B, thereby falsely generating the data of the person similar to the person A. The source non-specific person patterns transformed in S124 is used in the classifier generating process which is executed by the classifier generating unit 115.

In S125, the classifier generating unit 115 generates a classifier in which a plurality of target specific person patterns are set to a positive example and a plurality of target non-specific person patterns and a plurality of source non-specific person patterns transformed in S124 are set to a negative example. The classifier in the embodiment is a non-linear SVM using a Gaussian kernel in a manner similar to the embodiment 1.

In S126, the classifier data outputting unit 116 outputs a generation result of the classifier in S125 to the outside and finishes the processes of FIG. 12. For example, the classifier data outputting unit 116 records the data of the classifier learned in S125 into the auxiliary storage device 13, thereby outputting.

As described above, by the processes of the embodiment, the information processing apparatus 10 can generate the classifier for precisely classifying whether or not the input face image is a face image of a specific person. According to the classifier generated by the processes of the embodiment, since the data of the person similar to the person A is used for the learning, when the face image of the person similar to the person A is input, a possibility that if the input face image is not the face image of the person A, it can be correctly discriminated rises. In this manner, the information processing apparatus 10 can perform not only the generation of the classifier for detecting abnormal data but also the generation of the classifier for performing such a general pattern classification as to discriminate whether or not the input face image is a face image of the specific person. Although only the data of the person B' similar to the person B is transformed and used for the learning in the embodiment, a transformation rule may be obtained by using the data of the person B' as data of the specific category and the data of the person B transformed by such a transformation rule may be additionally used for the learning. It is more desirable that the information processing apparatus 10 uses not only one combination of the person B and the person B' but also a combination of other persons, obtains a transformation rule to each combination, and further adds the data transformed by such a transformation rule.

Other Embodiments

In all of the foregoing embodiments, the information processing apparatus 10 uses the linear transformation as a transformation rule. However, the information processing apparatus 10 can also use a non-linear transformation using a basic function as a transformation rule. More specifically speaking, the information processing apparatus 10 uses D basic functions (for example, Gaussian basic function) and, first, obtains a value in each of the D basic functions to each pattern of the source task learning data. By considering it as a D-dimensional vector, each pattern of the source task learning data is transformed into the D-dimensional vector. After that, if the number of dimensions of the pattern of the transformation destination is equal to d, it is sufficient that a matrix of D-row and d-column is prepared as a matrix A for the transformation and a value of each component of the matrix A is obtained by a method similar to that in the foregoing embodiments. As described above, the information processing apparatus 10 can also use the non-linear transformation as a transformation rule.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-119128, filed Jun. 15, 2016, which is hereby incorporated by reference herein in its entirety.

What is claimed is:

1. An information processing apparatus comprising:
one or more processors, wherein
the one or more processors function as each of following units including:
a first obtaining unit configured to obtain, in a first task as a target task, a plurality of target task learning data which belongs to a first category;
a second obtaining unit configured to obtain, in a second task different from the first task, a plurality of source task learning data including a plurality of first learning data which belongs to the first category and a plurality of second learning data which belongs to a second category different from the first category;
an adjusting unit configured to adjust a transformation parameter for a linear transformation of the plurality of source task learning data, the transformation parameter being to reduce a difference between a first density distribution of first feature vectors extracted respectively from the plurality of target task learning data belonging to the first category and a second density distribution of second feature vectors extracted respectively from the plurality of first learning data belonging to the first category included in the plurality of the source task learning data;
a transforming unit configured to transform third feature vectors extracted respectively from the plurality of second learning data belonging to the second category included in the plurality of source task learning data, by the linear transformation on the basis of the transformation parameter adjusted by the adjusting unit; and
a generating unit configured to generate a classifier regarding the first task by learning in which the third feature vectors transformed by the transforming unit and the first feature vectors extracted respectively from the plurality of target task learning data are used.

2. The information processing apparatus according to claim 1, wherein
the transforming unit is configured to obtain a transformation rule for locally minimizing the difference between the first density distribution and the second density distribution, and
the adjusting unit is configured to adjust the transformation parameter based on the obtained transformation rule.

3. The information processing apparatus according to claim 2, wherein the adjusting unit is configured to adjust the transformation parameter so as to locally minimize an estimation value of an L2 distance between the first density distribution and the second density distribution.

4. The information processing apparatus according to claim 2, wherein the adjusting unit is configured to adjust the transformation parameter so as to locally minimize an estimation value of a relative Pearson distance between the first distribution and the second distribution.

5. The information processing apparatus according to claim 2, wherein the adjusting unit is configured to adjust the transformation parameter so as to locally minimize a difference between the first density distribution and the second density distribution by using a gradation method.

6. The information processing apparatus according to claim 1, wherein
the one or more processors further function as:
a searching unit configured to search for the second task as a task similar to the first task, and
the second obtaining unit is configured to obtain the plurality of source task learning data searched for by the searching unit.

7. The information processing apparatus according to claim 1, wherein:
the transforming unit is configured to transform the third feature vector by a following equation, wherein it is assumed that the third feature vector is z and an after-transformation vector is x'

$$x'=ATz+b$$

where A is a square matrix of the same dimension as x', b is a bias vector of the same dimension as x', and
the adjusting unit is configured to adjust values of each component of the matrix A and each element of the bias vector b as the transformation parameters.

8. The information processing apparatus according to claim 1, wherein the generating unit is configured to select feature vector for use in the generation of the classifier on the basis of the third feature vectors transformed by the transforming unit and the first feature vectors, and to generate the classifier on the basis of the selected feature vector.

9. The information processing apparatus according to claim 1, wherein the one or more processors further function as:
a classifying unit configured to classify whether or not input data as a target of the classification belongs to the first category by using the classifier generated by the generating unit.

10. The information processing apparatus according to claim 1, wherein
the classifier is to perform the first task for detecting an abnormality in a predetermined area serving as a monitoring target of a surveillance camera, and
the second task is a task for detecting an abnormality in an area different from the predetermined area.

11. The information processing apparatus according to claim 10, wherein
the first category is a category showing a situation where the abnormality does not occur, and
the second category is a category showing a situation where the abnormality has occurred.

12. The information processing apparatus according to claim 1, wherein the classifier is to classify input data into the first category or the second category.

13. The information processing apparatus according to claim 1, wherein
the classifier is to perform the first task for discriminating whether or not a person shown by an input face image is a specific person, and
the second task is a task for discriminating whether or not a person shown by an input face image is another specific person different from the specific person.

14. The information processing apparatus according to claim 1, wherein
the transforming unit is configured to transform the third feature vectors extracted respectively from the plurality of second learning data and the second feature vectors extracted respectively from the plurality of first learning data on the basis of the transformation parameter adjusted by the adjusting unit, and
the generating unit is configured to generate the classifier by the learning data belonging to the first category included in the source task learning data and the learning in which the first feature vectors, the second feature vectors transformed by the transforming unit, and the third feature vectors transformed by the transforming unit are used.

15. The information processing apparatus according to claim 1, wherein
the classifier is to perform the first task for detecting, from an input image obtained by photographing a surface of a specific manufacturing product, a defect on the surface, and
the second task is a task for detecting, from an input image obtained by photographing another manufacturing product different from the specific manufacturing product, a defect on a surface of the another manufacturing product.

16. An information processing method which is executed by an information processing apparatus, the method comprising:
obtaining, in a first task as a target task, a plurality of target task learning data which belongs to a first category;
obtaining, in a second task different from the first task, a plurality of source task learning data including a plurality of first learning data which belongs to the first category and a plurality of second learning data which belongs to a second category different from the first category;
adjusting a transformation parameter for a linear transformation of the plurality of source task learning data, the transformation parameter being to reduce a difference between a first density distribution of first feature vectors extracted respectively from the plurality of target task learning data belonging to the first category and a second density distribution of second feature vectors extracted respectively from the plurality of first learning data belonging to the first category included in the plurality of source task learning data;
transforming third feature vectors extracted respectively from the plurality of second learning data belonging to the second category included in the plurality of source task learning data, by the linear transformation on the basis of the adjusted transformation parameter; and
generating a classifier regarding the first task by learning in which the transformed third feature vectors and the first feature vectors extracted respectively from the plurality of target task learning data are used.

17. A non-transitory computer-readable storage medium storing a program for causing a computer to execute a method comprising:
obtaining, in a first task as a target task, a plurality of target task learning data which belongs to a first category;
obtaining, in a second task different from the first task, a plurality of source task learning data including a plurality of first learning data which belongs to the first category and a plurality of second learning data which belongs to a second category different from the first category;
adjusting a transformation parameter for a linear transformation of the plurality of source task learning data, the transformation parameter being to reduce a difference between a first density distribution of first feature vectors extracted respectively from the plurality of target task learning data belonging to the first category and a second density distribution of second feature vectors extracted respectively from the plurality of first learning data belonging to the first category included in the plurality of source task learning data;

transforming third feature vectors extracted respectively from the plurality of second learning data belonging to the second category included in the plurality of source task learning data, by the linear transformation on the basis of the adjusted transformation parameter; and generating a classifier regarding the first task by learning in which the transformed third feature vectors and the first feature vectors extracted respectively from the plurality of target task learning data are used.

* * * * *